US009235965B2

(12) United States Patent
Tuck

(10) Patent No.: US 9,235,965 B2
(45) Date of Patent: Jan. 12, 2016

(54) ELECTRONIC GAMING DEVICE WITH PERSISTENT WILD REEL GAMES

(71) Applicant: Jeremy Tuck, Lawrenceville, GA (US)

(72) Inventor: Jeremy Tuck, Lawrenceville, GA (US)

(73) Assignee: Cadillac Jack, Duluth, GA (US)

( * ) Notice: Subject to any disclaimer, the term of this patent is extended or adjusted under 35 U.S.C. 154(b) by 117 days.

(21) Appl. No.: 13/870,843

(22) Filed: Apr. 25, 2013

(65) Prior Publication Data

US 2014/0323198 A1 Oct. 30, 2014

(51) Int. Cl.
*A63F 13/00* (2014.01)
*G07F 17/34* (2006.01)
*G07F 17/32* (2006.01)

(52) U.S. Cl.
CPC .............. *G07F 17/34* (2013.01); *G07F 17/323* (2013.01); *G07F 17/3206* (2013.01); *G07F 17/3211* (2013.01); *G07F 17/3227* (2013.01); *G07F 17/3244* (2013.01)

(58) Field of Classification Search
CPC ........................... G07F 17/326; G07F 17/3267
USPC ................................................ 463/16, 20, 25
See application file for complete search history.

(56) References Cited

U.S. PATENT DOCUMENTS

| | | | | |
|---|---|---|---|---|
| 2010/0197377 | A1* | 8/2010 | Aoki et al. | 463/20 |
| 2011/0098102 | A1* | 4/2011 | Gomez et al. | 463/20 |
| 2011/0136562 | A1* | 6/2011 | Loat et al. | 463/20 |
| 2013/0065662 | A1* | 3/2013 | Watkins et al. | 463/20 |
| 2013/0231174 | A1* | 9/2013 | Fujisawa et al. | 463/20 |
| 2014/0256410 | A1* | 9/2014 | Basallo et al. | 463/25 |

* cited by examiner

*Primary Examiner* — James S McClellan
(74) *Attorney, Agent, or Firm* — Weide & Miller, Ltd.

(57) ABSTRACT

Examples disclosed herein relate to systems and methods, which may receive wagers on one or more paylines. The systems and methods may initiate one or more persistent expanding wild reel structures. The systems and methods may generate one or more persistent wilds. The systems and methods may hold for one or more subsequent spins the one or more persistent wilds in one or more locations based on one or more persistent wild counter numbers. The systems and methods may determine one or more payouts based on the additional gaming functionality. The systems and methods may display one or more presentations based on the additional gaming functionality.

20 Claims, 17 Drawing Sheets

ELECTRONIC GAMING DEVICE WITH PERSISTENT WILD REEL GAMES

FIELD

The subject matter disclosed herein relates to an electronic gaming system and method of implementing a wagering game on an electronic gaming system. More specifically, the disclosure relates to an electronic gaming system and methods that provides persistent wild reel gaming functionality.

INFORMATION

The gaming industry has numerous casinos located both worldwide and in the United States, and both land-based and online. A client of a casino or other gaming entity can gamble via various games of chance. For example, craps, roulette, baccarat, blackjack, and electronic or electromechanical games (e.g., a slot machine, a video poker machine, and the like) where a person may gamble on an outcome.

Historically, the success of electronic gaming systems is dependent on several elements, which may not be readily apparent. Success can depend upon the prospect of winning money from the gaming system, whether such prospect is real or perceived which can carry an intrinsic entertainment value as compared to other gaming system offerings. Additionally, the success can also depend upon the ease by which a new player can understand the game mechanics, as it is unlikely that a new player will expend money wagering on a gaming system if they do not understand the game mechanics. A player's enjoyment and interest in a game may be increased by employing an electronic gaming system and methods that provides persistent wild reel gaming functionality.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
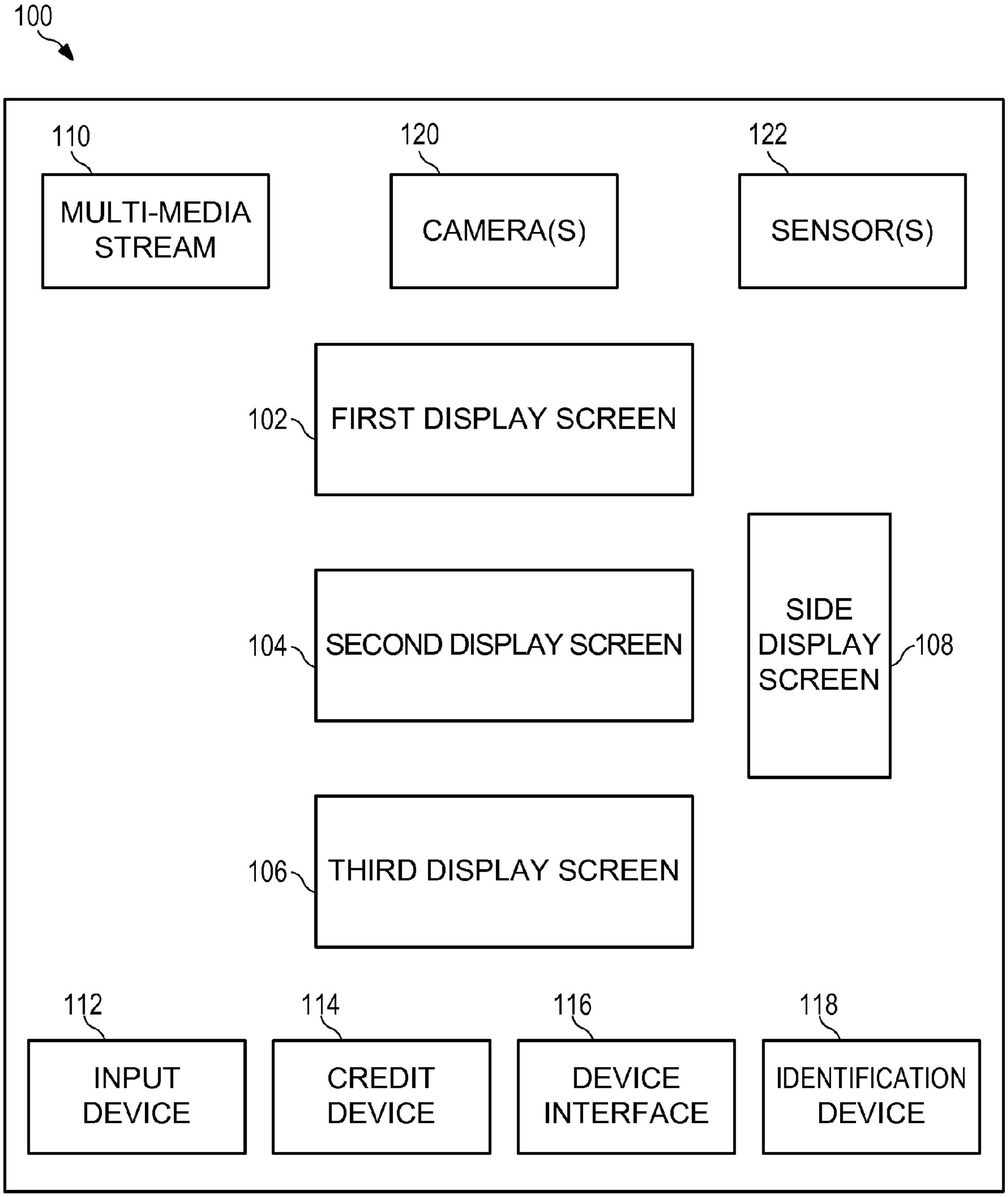
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to select one or more persistent wild reel gaming functionality, to control any object (e.g., a tool, a person, an image, a selection option, etc.), to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more persistent wild reel gaming functionality may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have game play which has only persistent wild reel gaming functionality (or similar functionality). Therefore, no games without persistent wild reel gaming functionality would be presented. In another example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

The presentations associated with one or more embedded gaming based game play may be presented on one, a few, and/or a plurality of screens. These presentations associated with one or more persistent wild reel gaming functionalities may be displayed on a portion of one, a few, and/or a plurality of these screens.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

Figure 2:
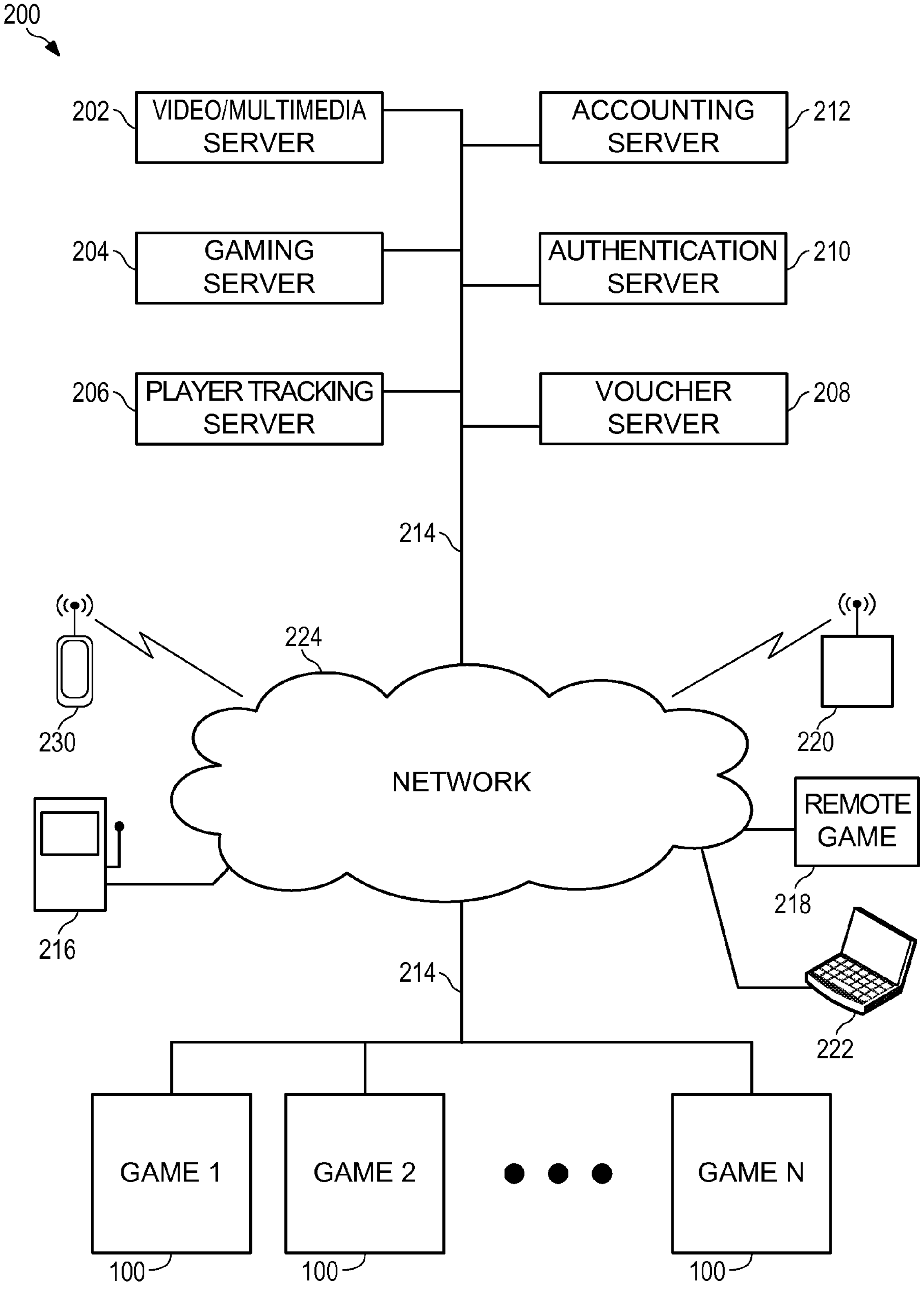
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a persistent wild reel gaming functionality, a persistent wild reel gaming evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include persistent wild reel gaming play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Statistics server may include data relating to one or more persistent wild reel based game play (or similar game play). This data may include the number of times a specific item (e.g., a first persistent wild, a second persistent wild, a first super persistent wild, a second super persistent wild, a rose, a star, etc.) was selected and/or replaced. The frequency of any specific item being selected and the amount won. This data may also include data relating to any interrelationship of elements. For example, when a first persistent wild is generated, then 30% of the time a second persistent wild is generated, and then 15% of the time a third persistent wild is generated. In another example, when a first part of reel one is replaced with a first replacement symbol, then 45% of the time a second part of reel two is replaced with the second replacement symbol, and then 10% of the time a third part of reel three is replaced with the third replacement symbol. In another example, when the star is selected, the player selects a rose on 75% of the time. Further, this selection pairing results in a winning result 55% of the time.

Figure 3:
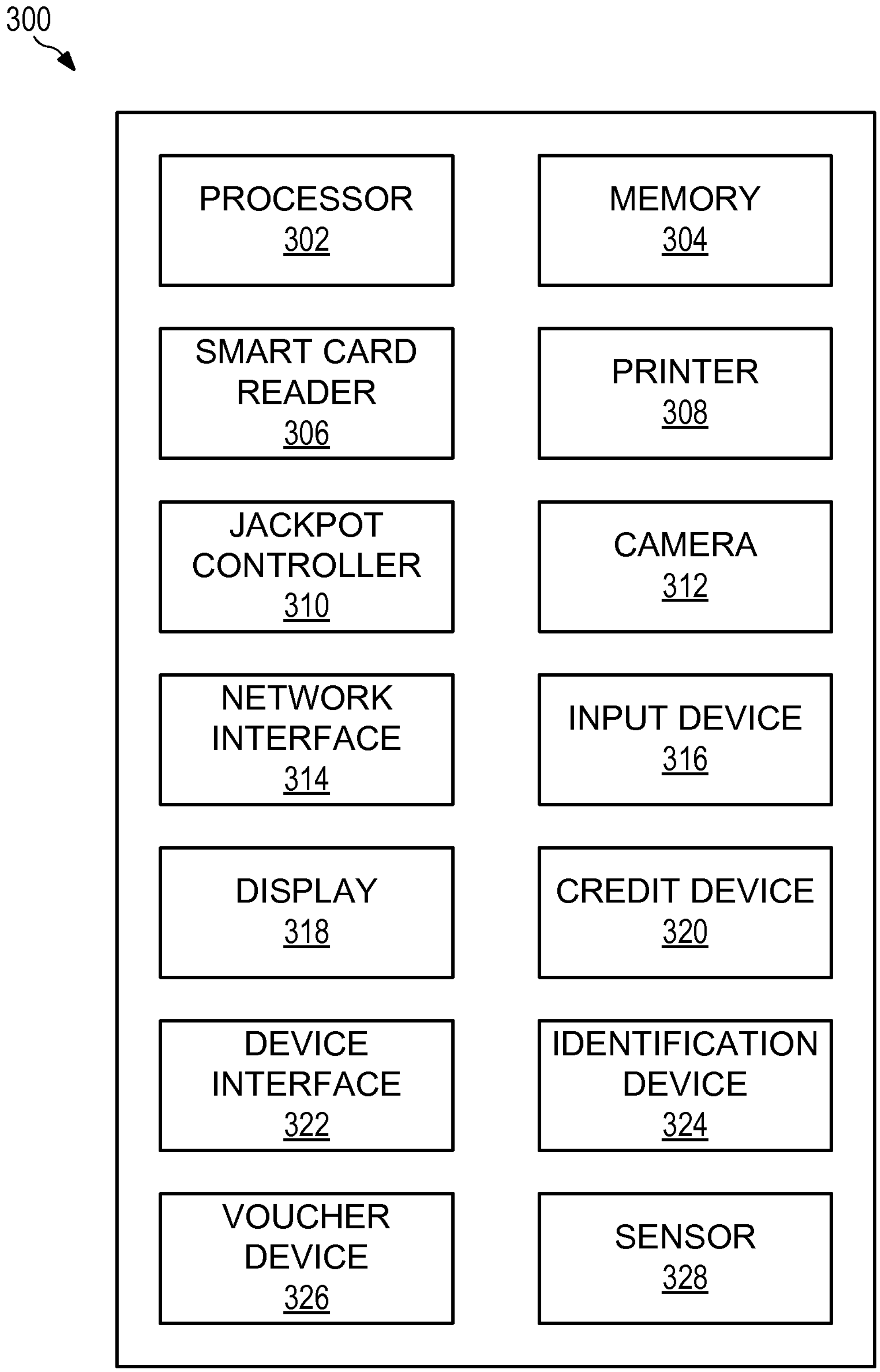
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to select one or more persistent wild reel gaming functionality, to select one or more game elements, to select one or more theme-based gaming options, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
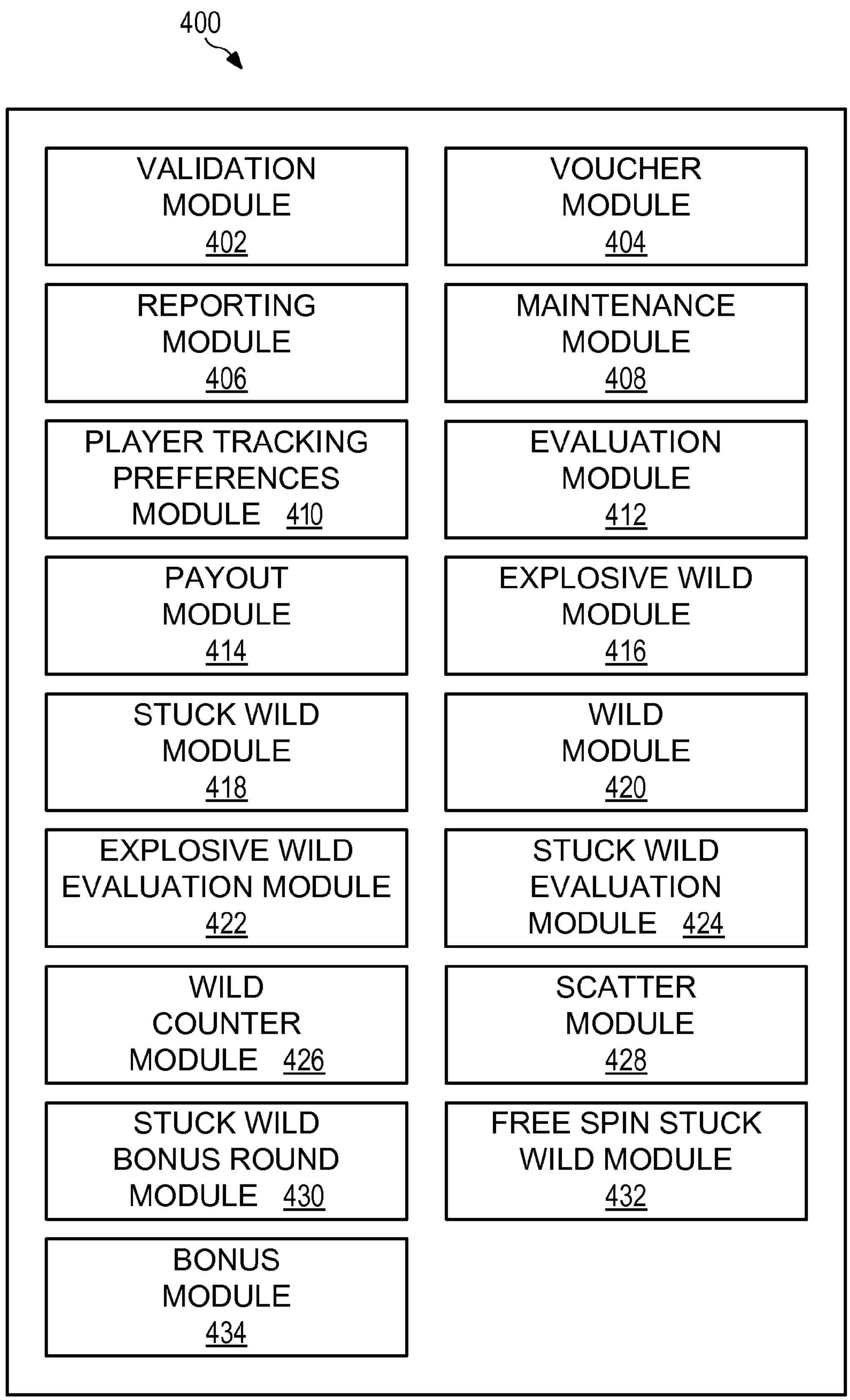
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, a payout module 414, an explosive wild module 416, a stuck wild module 418, a wild module 420, an explosive wild evaluation module 422, a stuck wild evaluation module 424, a wild counter module 426, a scatter module 428, a stuck wild bonus round module 430, a free spin stuck wild module 432, and/or a bonus module 434.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may evaluate one or more outcomes for one or more events which may not be based on one or more outcomes for one or more persistent wild reel gaming functionality based game play. Evaluation module 412 may evaluate one or more outcomes for one or more events which may be based on one or more outcomes for persistent wild reel gaming functionality based game play Payout module 414 may determine one or more payouts which may relate to one or more inputs received from the player, electronic gaming device 100, and/or electronic gaming system 200. Payout module 418 may determine one or more payouts based on one or more selections.

Scatter module 428 may determine one or more scatter structures and/or store any data relating to one or more scatter symbols.

Bonus module 434 may generate a bonus game, evaluate the results of the bonus game, trigger bonus game presentations, generate bonus game payouts, and/or display any data relating to the bonus game.

Explosive wild module 416 may generate, compile, store, transmit, and/or obtain one or more explosive wild structures. Explosive wild module 416 may generate, compile, store, transmit, and/or obtain any data related to one or more explosive wilds.

Stuck wild module 418 may generate, compile, store, transmit, and/or obtain one or more stuck wild structures. Stuck wild module 418 may generate, compile, store, transmit, and/or obtain any data related to one or more stuck wilds.

Wild module 420 may generate, compile, store, transmit, and/or obtain one or more wild structures. Wild module 418 may generate, compile, store, transmit, and/or obtain any data related to one or more wilds.

Explosive wild evaluation module 422 may evaluate one or more outcomes for one or more events which may be based on one or more outcomes for one or more explosive wild reel gaming functionality based game play.

Stuck wild evaluation module 424 may evaluate one or more outcomes for one or more events which may be based on one or more outcomes for one or more stuck wild reel gaming functionality based game play.

Wild counter module 426 may generate, determine, compile, store, transmit, and/or obtain data relating to one or more wild counters (e.g., persistent wild, etc.).

Stuck wild bonus round module 430 may hold one or more wild counter numbers based on bonus game play.

Free-spin stuck wild module 432 may hold one or more wild counter numbers based on free-spin game play. In another example, free-spin stuck will module 432 may not hold one or more wild counter numbers based on free-spin game play.

A reel interaction evaluation module may evaluate, store, generate, compile, and/or transmit data relating to one or more reel interactions.

A presentation generation module may generate the presentation data (e.g., visual and audio) relating to one or more game play options. A presentation module may display one or more of the generated presentations.

It should be noted that one or more modules may be combined into one module. Further, there may be one evaluation module where the determined payout does not depend on whether there were any persistent wild symbols, wild symbols, scatter symbols, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5A:
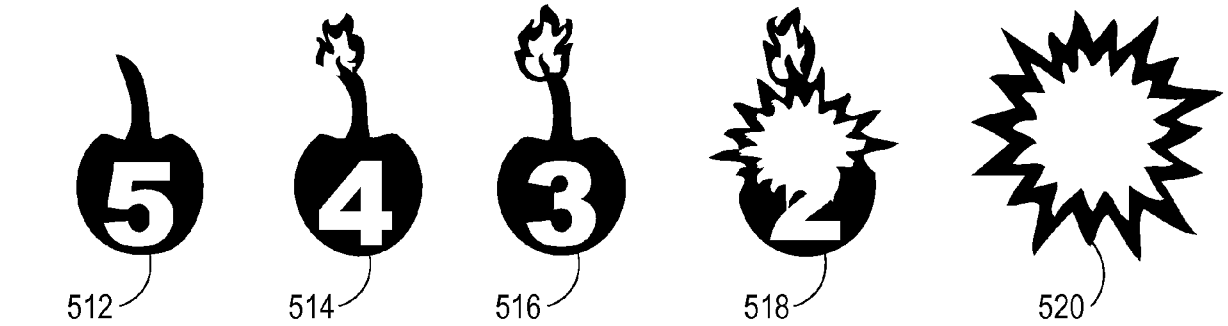
FIG. 5A is an illustration of a persistent wild reel gaming functionality on an exemplary gaming system, according to one embodiment.

FIG. 5A shows a first image 512, a second image 514, a third image 516, a fourth image 518, and a fifth image 520, according to one embodiment. First image 512 shows the symbol in a non-ignited state. Second image 514 shows the symbol in an initial ignited state. Third image 516 shows the symbol in a further ignited state. Fourth image 518 shows the symbol in an initial explosive state. Fifth image 520 shows the symbol in an explosive state.

In another example, randomly (and/or in a predetermined pattern) during spins, one or more Wild symbols may get "stuck" (e.g., held, be in a persistent state, etc.) in one or more locations on the reel space. When this occurs, the "stuck" wild will display a counter on it. The number on the counter may be determined by a predetermined pattern and/or by a random number generator or a combination of both. The number may be a number of spins, a time period, any other measurement, and/or any combination thereof. In one example, at the beginning of each spin after the wild gets "stuck", the counter is decremented by one for each of the spins until it reaches zero. When the spin counter reaches zero on a specific spin, then the "stuck" wild may "explode" to multiple locations across the reels and these wilds may affect the pay calculation for the current spin and are used to augment the player's potential win (see FIG. 5B and FIG. 6G). This may be determined by a predetermined pattern and/or by a random number generator or a combination of both. In one example, after the one or more payouts with the new wilds are calculated and when the player chooses to spin the reels again, the symbols may revert to normal and game play may spin the reels as normal and the game outcome is determined by the reel strips as in the base game.

In one example, a first number image (and/or a first clock image and/or any other image), a second number image (and/or a second clock image), a third number image (and/or a third clock image), a fourth number image (and/or a fourth clock image), and a fifth number image (and/or a fifth clock image)

are generated and/or displayed. The first number image shows the symbol in a non-ignited state with a number of 5, which represents the number of spins before the image (e.g., the wild symbol, etc.) explodes. The second number image shows the symbol in an initial ignited state with a number of 4, which represents the number of spins before the image (e.g., the wild symbol) explodes. The third number image shows the symbol in a further ignited state with a number of 3, which represents the number of spins before the image (e.g., the wild symbol) explodes. The fourth number image shows the symbol in an initial explosive state with a number of 2, which represents the number of spins before the image (e.g., the wild symbol) explodes. The fifth number image shows the symbol in an explosive state where the wild symbols explodes into one or more reel spaces (See FIG. 5B and FIG. 6G). In another example, a clock may have clock arms that move (e.g., from 10 seconds down to zero, from 1 minute down to zero, from 1 hour down to zero, etc.) to show that the symbol is moving to an explosive state.

Figure 5B:
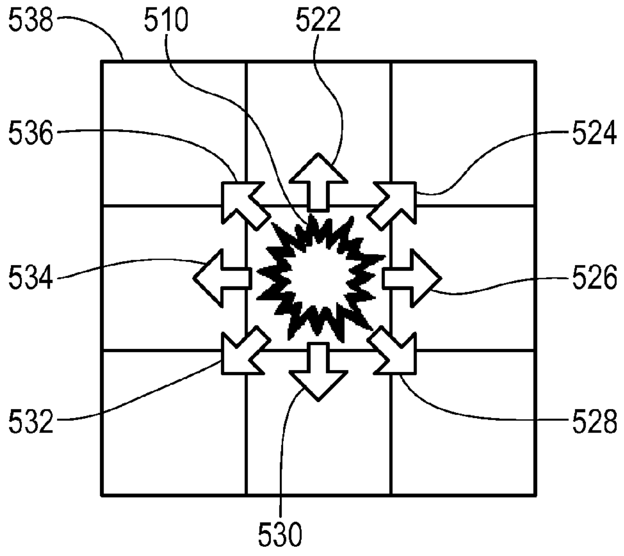
FIG. 5B is an illustration of another persistent wild reel gaming functionality on an exemplary gaming system, according to one embodiment.

In FIG. 5B, an illustration showing various directions that the explosion may travel from an exploding symbol are shown, according to exemplary embodiments. A grid 538 shows an exploding symbol 510, according to an embodiment. An explosion from exploding symbol 510 may travel in a first direction 522, a second direction 524, a third direction 526, a fourth direction 528, a fifth direction 530, a sixth direction 532, a seventh direction 534, an eighth direction 536, and/or any other directions. First direction 522 may be one or more spaces up. Second direction 524 may be one or more spaces diagonally up and one or more spaces to the right. Third direction 526 may be one or more spaces to the right. Fourth direction 528 may be one or more spaces diagonally down and one or more spaces to the right. Fifth direction 530 may be one or more spaces down. Sixth direction 532 may be one or more space diagonally down and one or more spaces to the left. Seventh direction 534 may be one or more spaces to the left. Eight direction 536 may be one or more spaces diagonally up and one or more spaces to the left. Another direction may be two spaces to the left and then one space up. In addition, a direction may be two spaces down, three spaces to the right, and then one space up.

In an exemplary embodiment, after the reels stop spinning and an award is determined, one or more stuck wild symbols may explode and replace symbols in a predetermined area and turn the replaced (e.g., contacted) symbols into an award (e.g., wild symbols, symbols, credits, free spins, multipliers, etc.).

In another example, symbols may form a chain reaction and generate an increased award. This chain reaction may include two or more symbols on one or more reels. For example, a stuck wild which explodes may modify a normal wild into another stuck wild which explodes. In another example, a stuck wild which explodes may modify any symbol into another symbol (e.g., a scatter symbol into a wild symbol, a scatter symbol into an exploding wild symbol, an ace symbol into a wild symbol, etc.).

In another example, a free-spin stuck wild bonus may include three or more free-spin stuck wild symbols (and/or any other symbols) which may appear anywhere on reels 2, 3, and 4. These symbols may unlock free-spin awards. In this example, additional free-spin stuck wild, scatters, wild, and/or a specific symbol (e.g., an Ace, a king, etc.) may be generated on one or more reels, which may increase the awards (e.g., credits, free spins, multipliers, etc.) in a bonus round.

In another example, after the award for the one or more stuck wilds are generated, the one or more stuck wilds may begin to sizzle, the one or more stuck wilds may then explode, which may generate additional awards for the symbols that the explosions react with. In another example, the awards may be placed into a central bucket.

In an embodiment, the value (e.g., credits, free spins, multipliers, etc.) of a symbol (e.g., the one or more stuck wilds, an Ace, a King, a wild, a scatter) may vary based on the image utilized for this symbol. For example, a stuck wild symbol that explodes may be worth more than a wild symbol that explodes. In this example, the wild symbol that explodes may be worth more than an Ace that explodes. Further, an Ace that explodes may be worth more than a Jack that explodes.

In another embodiment, the value (e.g., credits, free spins, multipliers, etc.) of a symbol (e.g., the one or more stuck wilds, an Ace, a King, a wild, a scatter) may vary based on the distance (e.g., position) relative to the initiating stuck wild which explodes. For example, a first symbol (e.g., a wild, an Ace, etc.) that has a value of 100 credits that is one block away from the exploding stuck wild symbol may be worth 500 credits. Whereas, the first symbol that has a value of 100 credits that is two blocks away from the exploding stuck wild symbol may be worth 350 credits. Whereas, the first symbol that has a value of 100 credits that is three blocks away from the exploding stuck wild symbol may be worth 200 credits. Whereas, the first symbol that has a value of 100 credits that is four blocks away from the exploding stuck wild symbol may be worth 150 credits. Whereas, the first symbol that has a value of 100 credits that is five blocks away from the exploding stuck wild symbol may be worth 100 credits. It should be noted that these values can be modified in any fashion.

For example, the first symbol that has a value of 100 credits that is five blocks away from the exploding stuck wild symbol may be worth 500 credits. Whereas, the first symbol that has a value of 100 credits that is one block away from the exploding stuck wild symbol may be worth 100 credits.

In another embodiment, the value (e.g., credits, free spins, multipliers, etc.) of a symbol may vary by the number of exploding symbols. This may increase the multiplier up for each subsequent event or for this specific stuck wild event. For example, a first explosion may be at 1× the reward amount, the second explosion may be at 2× the reward amount, the third explosion may be at 3× the reward amount, etc. In another example, the second explosion (up to the $N^{th}$ N explosion) may increase the award for all explosions (e.g., past explosions, current explosions, future explosions, and/or any combination thereof). In another example, the exploding symbols may have a random multiplier. In another example, the value may be based on the number of symbols impacted. For example, there was would be different value for impacting three symbols compared to four symbols.

In another embodiment, additional bonus payouts may be awarded for particular patterns of unexploded versus exploded symbols on the reel matrix. For example, when all four corners are exploded (or unexploded) an additional bonus payout may occur. In another example, when all symbols in a row are exploded (or unexploded) an additional bonus payout may occur. In another example, when all symbols of a certain multiple reels are exploded (or unexploded) an additional payout may occur. In another example, when all of the symbols on the reels are exploded (or unexploded) an additional bonus payout may occur. These additional bonus payouts may be credits or a trigger for another bonus. This additional bonus may be free spins or a progress jackpot. These patterns may be re-evaluated every game (e.g. spin) or complied over multiple games (e.g., spins).

In another embodiment, exploding symbols may always explode. In another example, exploding symbols may explode when an additional wager is made (e.g., ante bet). In another example, exploding symbols may explode no matter how many exploding symbols are present on the reels. In addition, exploding symbols may explode independent of their position on the reels. In another example, exploding symbols may explode when a minimum number of exploding symbols are located on the reels. In another example, exploding symbols may explode when multiple exploding symbols appear on consecutive reels starting on the leftmost reel. In another example, exploding symbols may explode based on a counter (e.g., a counter of 4 may explode once the counter reaches 0, 1, and/or any other number) (see FIG. 5A).

Figure 6A:
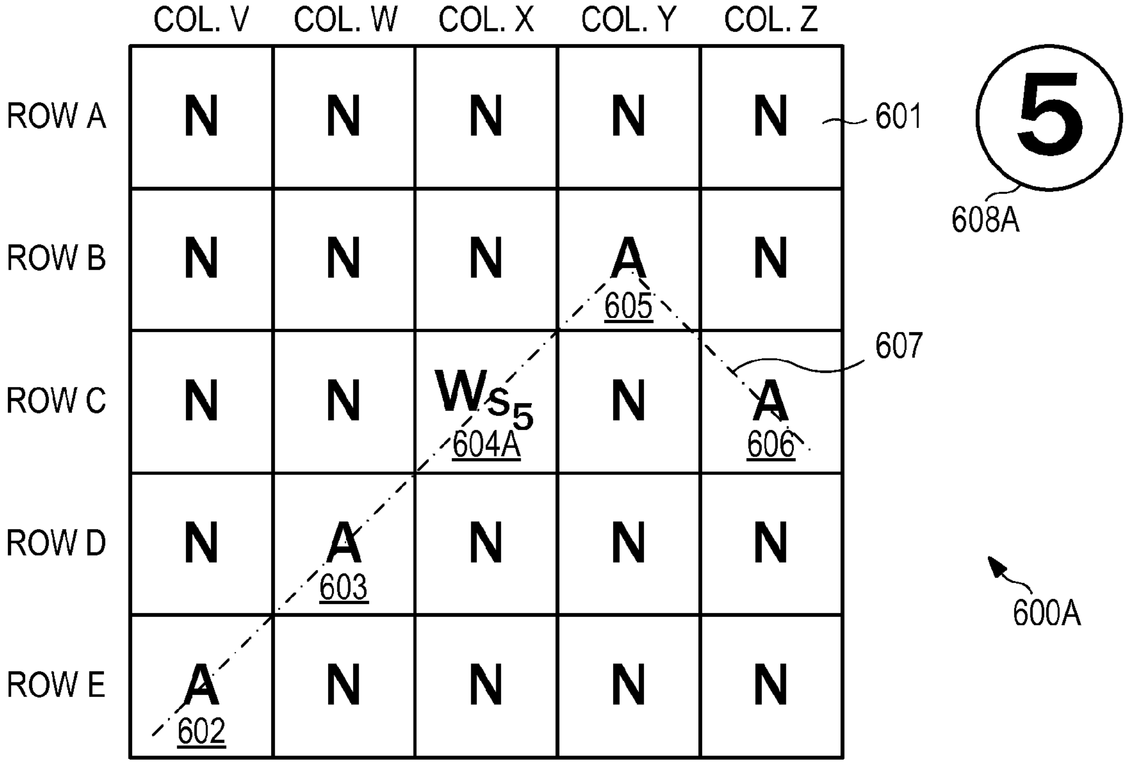
FIG. 6A is an illustration of a persistent wild gaming functionality on an exemplary gaming system, according to one embodiment.

FIG. 6A is an illustration of a persistent wild gaming functionality on an exemplary gaming system, according to one embodiment. In one embodiment, the reels are characterized by including five rows (e.g., Rows A-E) and five columns (e.g., Columns V-Z). In this example, a first display 600A shows that a first persistent wild 604A has been generated and displayed at a first location (e.g., Row C and Col. X). First persistent wild 604A may remain in this first location for five spins, which is indicated by the five in a first persistent wild counter image 608A. In this example, a first payline 607 had a winning combination of five Aces because a first ace 602, a second ace 603, a third ace 605, and a fourth ace 606 were matched up with first persistent wild 604A. In this example, first persistent wild 604A was converted into an ace to generate a five aces payout on first payline 607. It should be noted that the N symbol represents a blank symbol 601. Blank symbol 601 and/or a combination of blank symbols do not generate a payout. In this example, first persistent wild 604A may have an image similar to first image 512 (see FIG. 5A), which shows the symbol in a non-ignited state.

Figure 6B:
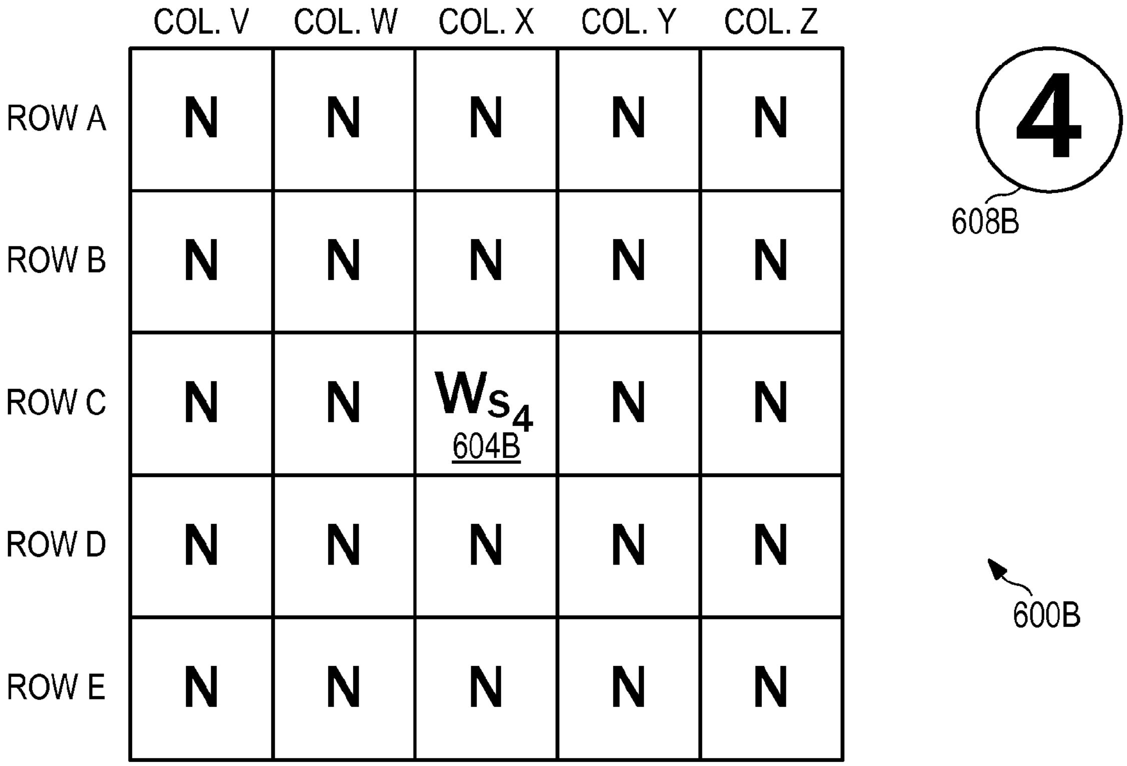
FIG. 6B is another illustration of a persistent wild reel gaming functionality on an exemplary gaming system, according to one embodiment.

In FIG. 6B, another illustration of a persistent wild reel gaming functionality on an exemplary gaming system is shown, according to one embodiment. In this example, a second display 600B shows that a second persistent wild 604B has been generated and displayed at a first location (e.g., Row C and Col. X). Second persistent wild 604B may remain in this first location for four more spins, which is indicated by the four in a second persistent wild counter image 608B. It should be noted that first persistent wild 604A and second persistent wild 604B may be the same wild where first persistent wild 604A has five more spins to remain in first location, whereas, second persistent wild 604B has four more spins to remain in first location. In this example, first persistent wild 604A was held in place and is now represented by second persistent wild 604B. In this example, there were no payouts based on one or more blank symbols 601. In this example, second persistent wild 604B may have an image similar to second image 514 (see FIG. 5A), which shows the symbol in an initial ignited state.

Figure 6C:
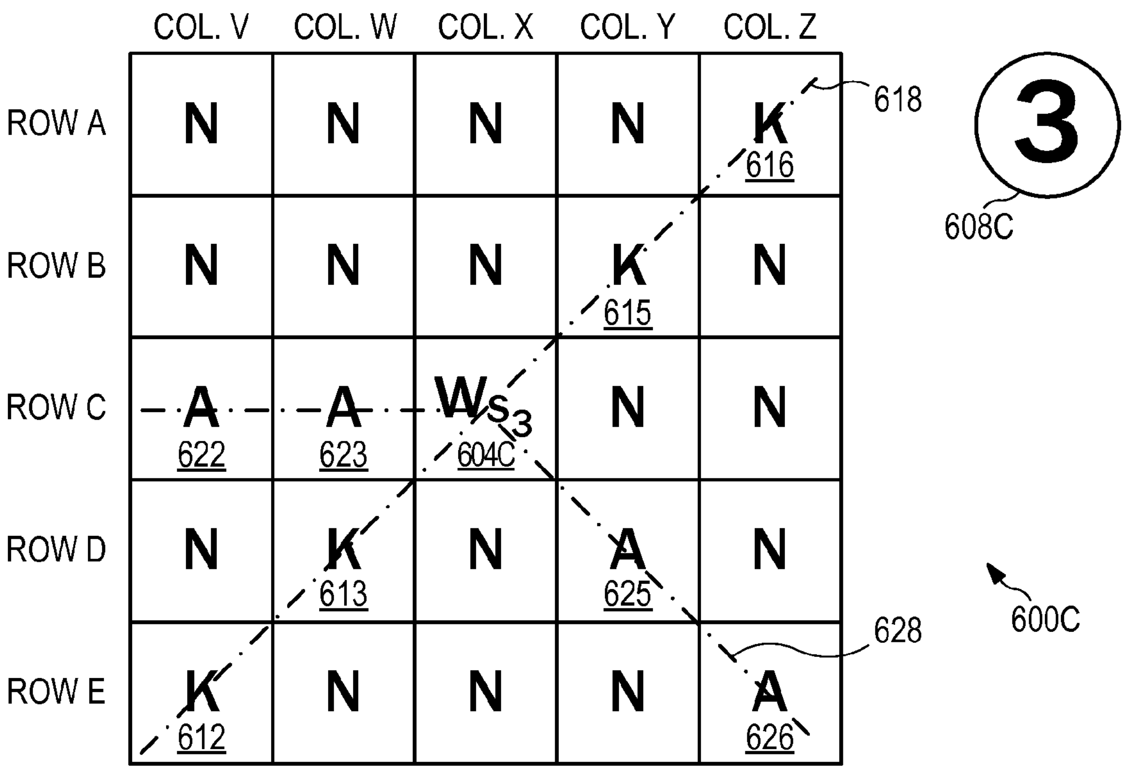
FIG. 6C is another illustration of a persistent wild gaming functionality on an exemplary gaming system, according to one embodiment.

In FIG. 6C, another illustration of a persistent wild gaming functionality on an exemplary gaming system is shown, according to one embodiment. In this example, a third display 600C shows that a third persistent wild 604C has been generated and displayed at a first location (e.g., Row C and Col. X). Third persistent wild 604C may remain in this first location for three more spins, which is indicated by the three in a third persistent wild counter image 608C. It should be noted that first persistent wild 604A, second persistent wild 604B, and/or third persistent wild 604C may be the same wild where first persistent wild 604A has five more spins to remain in first location; second persistent wild 604B has four more spins to remain in first location; and third persistent wild 604C has three more spins to remain in first location. In this example, first persistent wild 604A was held in place and is being labeled as second persistent wild 604B and/or third persistent wild 604C for clarity purposes. In this example, there were two winning combinations. The first winning combination (e.g., five kings) was on a second payline 618 and the second winning combination (e.g., five aces) was on a third payline 628. In this example, third persistent wild 604C may have an image similar to second image 516 (see FIG. 5A), which shows the symbol in a further ignited state.

Figure 6D:
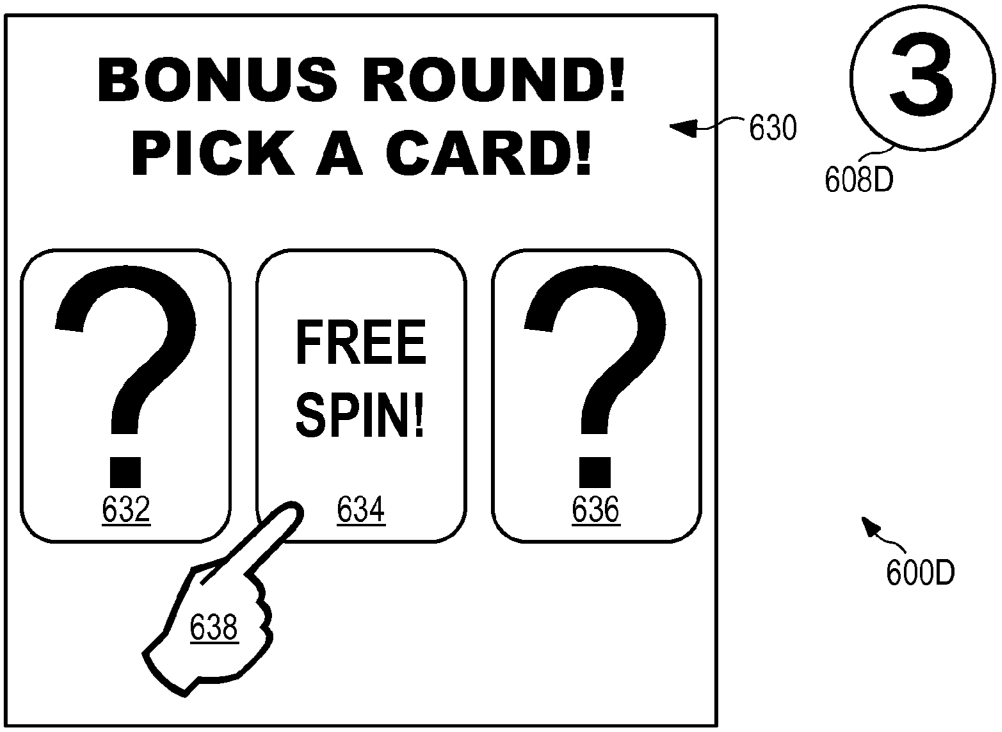
FIG. 6D is another illustration of a persistent wild gaming functionality on an exemplary gaming system, according to one embodiment.

In FIG. 6D, another illustration of a persistent wild gaming functionality on an exemplary gaming system is shown, according to one embodiment. In one example, when a wild symbol is stuck (e.g., in a persistent state) and the game enters a bonus round (pick game, etc.), the counter (e.g., persistent wild counter—608A, 608B, 608C, etc.) for one or more persistent wilds and/or the one or more persistent wilds' locations on the reel may be maintained and when the game returns to the standard game (e.g., the bonus game is over), the wild symbol may remain stuck until the counter expires.

For example, a fourth image 600D shows that the game has enter a pick bonus round 630. In pick bonus round 630, the player may select one or more cards from a first card 630, a second card 634, and/or a third card 636. In this example, the player via a hand 638 has selected second card 634 which generated a free spin award. In this example, a fourth persistent wild counter image 608D still shows that the persistent wild 604C may remain in this first location for three more spins.

In another example, when the game enters a free-spin mode while a wild is stuck, the wild may remain stuck in the free-spin mode and the counter may continue to decrement as normally during free-spin mode.

Figure 6E:
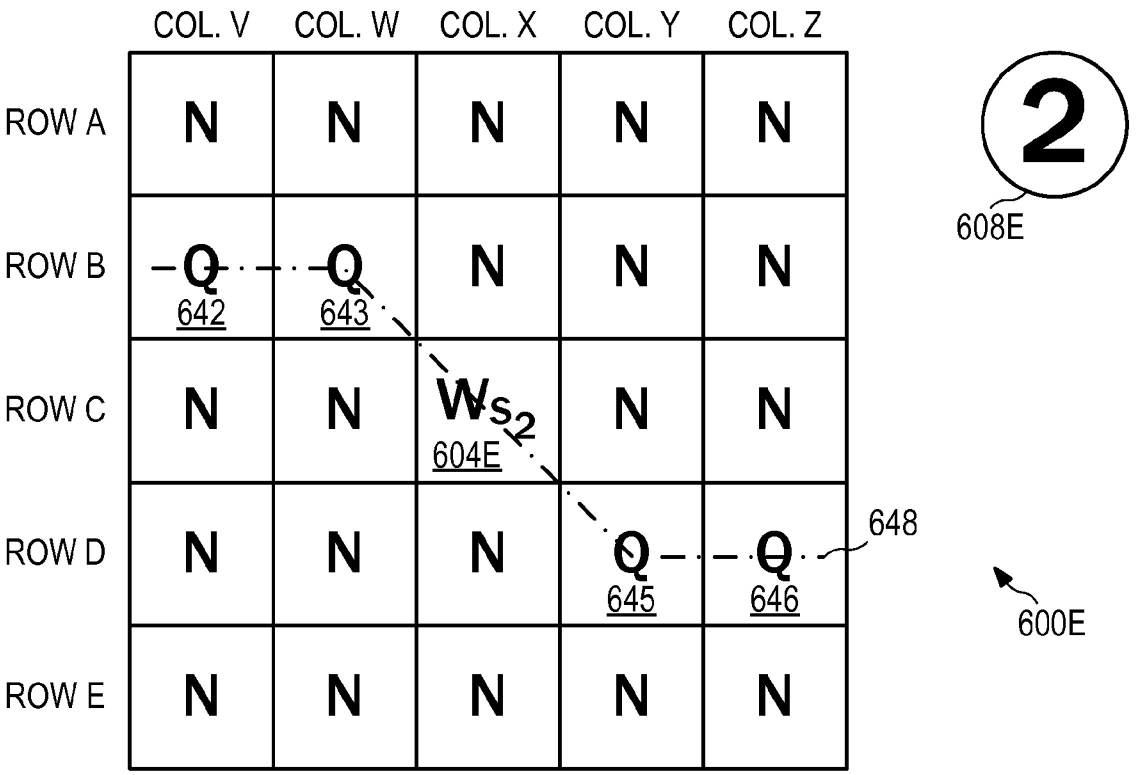
FIG. 6E is another illustration of a persistent wild gaming functionality on an exemplary gaming system, according to one embodiment.

In FIG. 6E, another illustration of a persistent wild gaming functionality on an exemplary gaming system is shown, according to one embodiment. In this example, a fifth display 600E shows that a fourth persistent wild 604E has been generated and displayed at a first location (e.g., Row C and Col. X). Fourth persistent wild 604E may remain in this first location for two more spins, which is indicated by the two in a fifth persistent wild counter image 608E. It should be noted that first persistent wild 604A, second persistent wild 604B, third persistent wild 604C, and/or fourth persistent wild 604E may be the same wild where first persistent wild 604A has five more spins to remain in first location; second persistent wild 604B has four more spins to remain in first location; third persistent wild 604C has three more spins to remain in first location; and fourth persistent wild 604E has two more spins to remain in first location. In this example, there was a winning combination (e.g., five queens) generated on a fourth payline 648. In this example, fourth persistent wild 604E may have an image similar to fourth image 518 (see FIG. 5A), which shows the symbol in an initial explosive state.

Figure 6F:
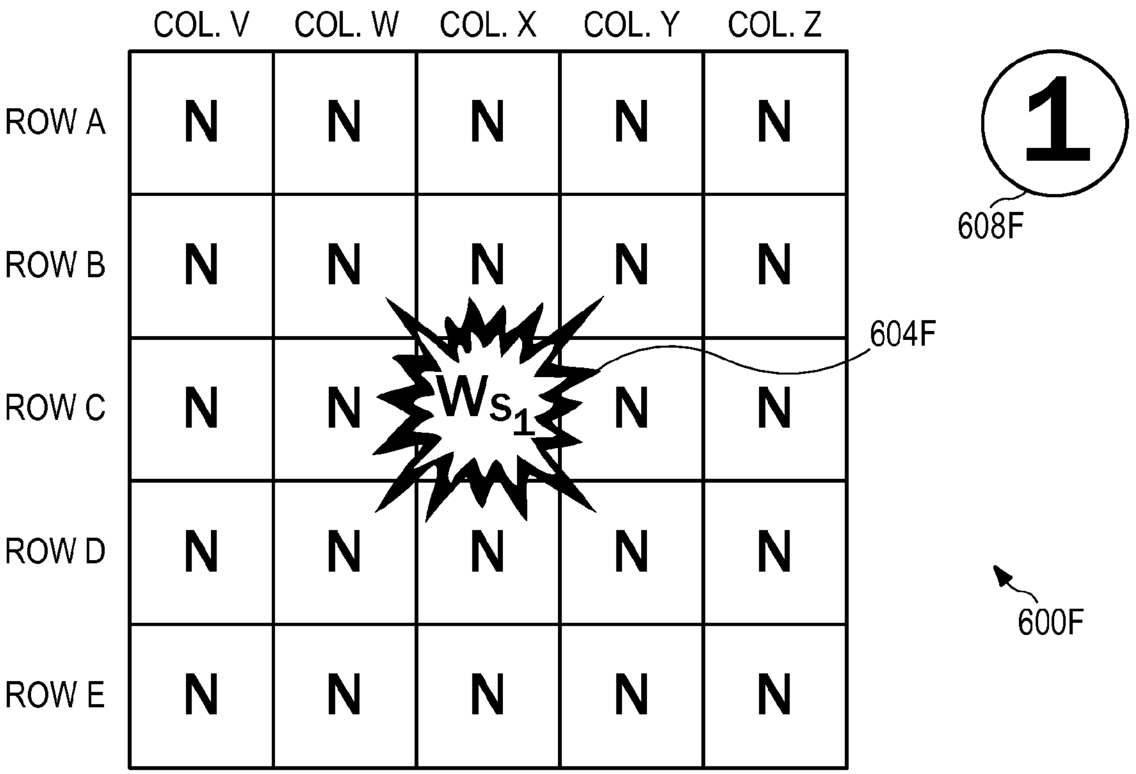
FIG. 6F is another illustration of a persistent wild gaming functionality on an exemplary gaming system, according to one embodiment.

In FIG. 6F, another illustration of a persistent wild gaming functionality on an exemplary gaming system is shown, according to one embodiment. In this example, a sixth display 600F shows that a fifth persistent wild 604F has been generated and displayed at a first location (e.g., Row C and Col. X). Fifth persistent wild 604F may remain in this first location for 1 more spin, which is indicated by the one in a sixth persistent wild counter image 608F. It should be noted that first persistent wild 604A, second persistent wild 604B, third persistent wild 604C, fourth persistent wild 604E, and/or fifth persistent wild 604F may be the same wild where first persistent wild 604A has five more spins to remain in first location; second persistent wild 604B has four more spins to remain in first location; third persistent wild 604C has three more spins to remain in first location; fourth persistent wild 604E has two more spins to remain in first location; and fifth persistent wild 604F has one more spin to remain in first location. In this example, there were no winning combinations. In this example, fifth persistent wild 604F may have an image similar to fifth image 520 (see FIG. 5A), which shows the symbol in an explosive state.

Figure 6G:
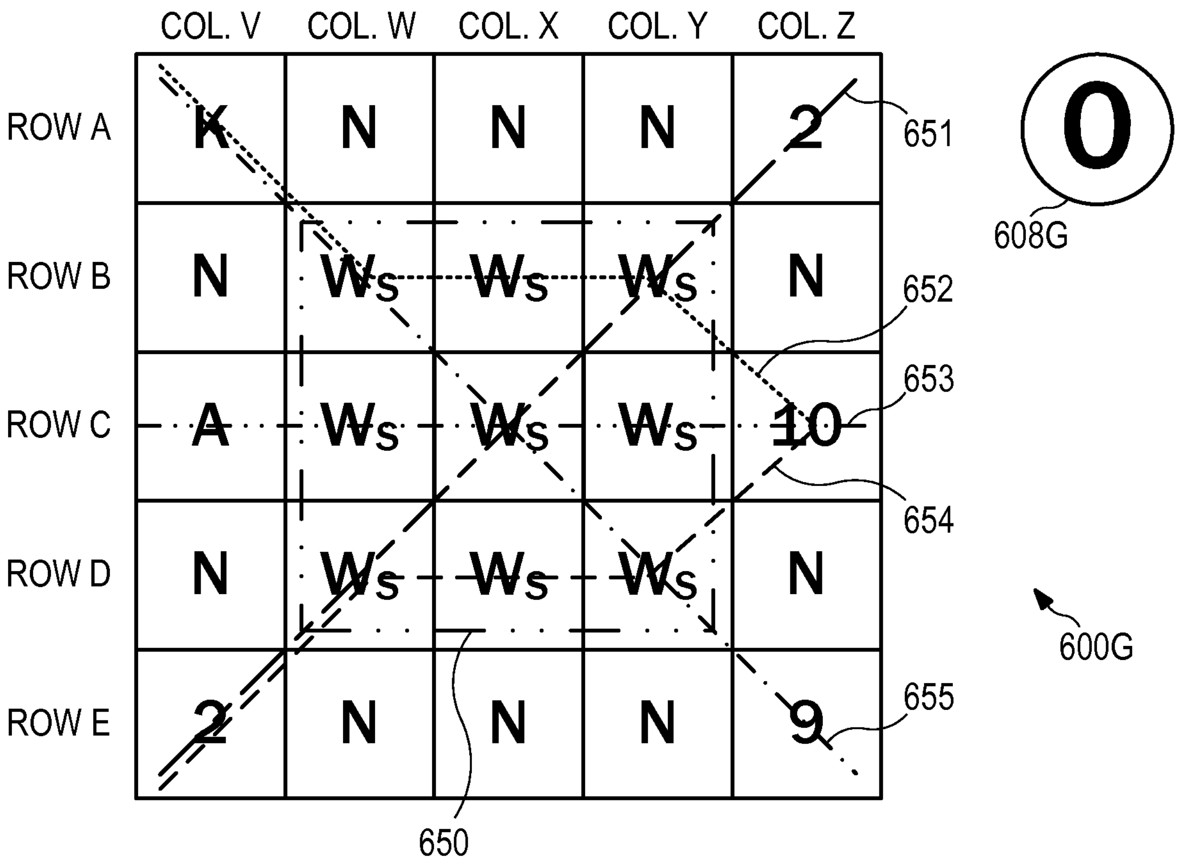
FIG. 6G is another illustration of a persistent wild gaming functionality on an exemplary gaming system, according to one embodiment.

In one example, fifth persistent wild 604F has exploded to occupy nine symbol areas (see FIG. 6G). In this example, the persistent wild will no longer occupy first location (e.g., Row C and Col. X) during the next spin, which is indicated by the zero in seventh persistent wild counter image 608G. In seventh display 600G; the exploding wild has created a wild box 650. Wild box 650 occupies nine symbol areas (e.g., Row B along with Columns W-Y, Row C along with Columns W-Y, and Row D along with Columns W-Y). In this example, wild box 650, along with the other symbols have created five winning combinations. A first winning combination (e.g., five twos) was generated on a fifth payline 651. A second winning combination (e.g., four kings and/or four tens) was generated on a sixth payline 652. A third winning combination (e.g., four aces and/or four tens) was generated on a seventh payline 653. A fourth winning combination (e.g., four twos and/or four tens) was generated on an eighth payline 654. A fifth winning combination (e.g., four nines and/or four kings) was generated on a ninth payline 655. In should be noted that wild box 650 may have any form (see FIG. 6H).

Figure 6H:
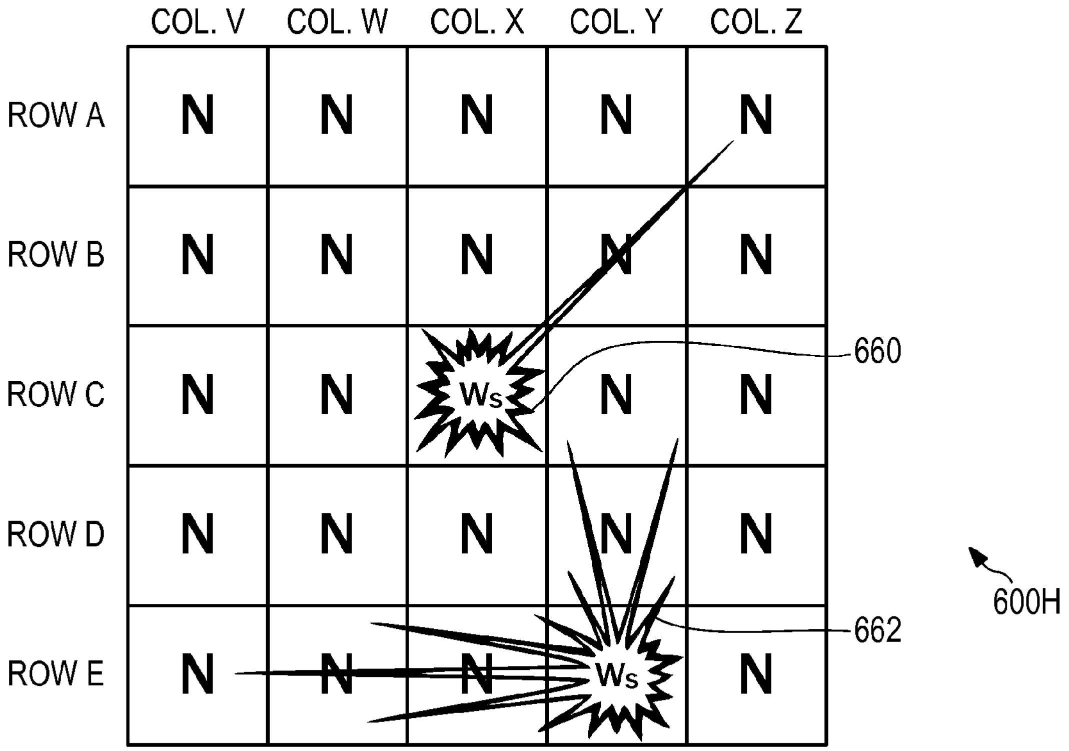
FIG. 6H is another illustration of a persistent wild gaming functionality on an exemplary gaming system, according to one embodiment.

In FIG. 6H, another illustration of a persistent wild gaming functionality on an exemplary gaming system is shown, according to one embodiment. In eighth display 600H, a first exploding wild 660 and a second exploding wild 662 are shown. In this example, first exploding wild 660 may explode two spatial units to the upper right. In this example, first exploding wild 660 would place wild symbols in three symbol boxes (e.g., Row C/Col. X, Row B/Col. Y, and Row A/Col. Z). In this example, second exploding wild 662 may explode two spatial units up and three spatial units to the left. In this example, second exploding wild 662 would place wild symbols in six symbol boxes (e.g., Row E along with Columns V-Y and Column Y along with Rows C-D).

In one example, one or more explosive wilds may be positioned relative to (or in contact with) symbols, which may interact with one or more explosive wilds. For example, explosive wild in cell (Row B/Col. V) may have exploded onto five different cells (e.g., Row A/Col. V, Row A/Col. W, Row B/Col. V, Row C/Col. V, and Row C/Col. W). In this example, explosive wild may be limited because there are no cells to the left of explosive wild. Therefore, this explosive wild may only enter into five cells. This explosion may, in one or more of the five different cells reveal wild symbols, symbols, super-wild symbols, credits, multipliers, free spins, any other reward, and/or any combination thereof.

In another example, explosive wild in cell (Row C/Col. X) may have expanded into eight different cells (e.g., Row B/Col. W, Row B/Col. X, Row B/Col. Y, Row C/Col. W, Row C/Col. Y, Row D/Col. W, Row D/Col. X, and Row D/Col. Y). In this example, explosive wild may not be limited because there are cells all around explosive wild. Therefore, this explosive wild may enter all eight cells around explosive wild. This explosion may, in one or more of the eight different cells reveal wild symbols, symbols, super-wild symbols, credits, multipliers, free spins, any other reward, and/or any combination thereof.

Further, explosive wild in cell (Row E/Col. Y) may enter five different cells (e.g., Row D/Col. X, Row D/Col. Y, Row D/Col. Z, Row E/Col. X, and Row E/Col. Z). In this example, explosive wild may be limited because there are no cells below explosive wild. Therefore, this explosive wild may only enter into five cells. This explosion may, in one or more of the five different cells reveal wild symbols, symbols, super-wild symbols, credits, multipliers, free spins, any other reward, and/or any combination thereof. These explosions may be animated.

In this example, explosive wilds may have a power level of one. The power level may represent the number of spaces that explosive wild may expand into, explode into, enter into, generate a path to, and/or reach. Further, if one or more explosive wilds explode into the same cell (e.g., Row B/Col. W, Row C/Col. W, Row D/Col. X, and Row D/Col. Y) the amount of rewards may be increased (e.g., multiplied, increased by a flat amount, combined with another reward, and/or any combination thereof). For example, the reward in any one of these cells may have been 100 credits, which is converted into 200 credits because there was a 2× multiplier based on the two explosive wilds entering the same cell. In another example, the award may have been increased by 200 credits to 300 credits based on the two explosive wilds entering the same cell. In yet another example, the award may have included a 2× multiplier, 200 extra credits, and 5 free spins based on the two explosive wilds entering the same cell.

In another example, a wrap-around effect may be utilized with one or more persistent wilds, explosive wilds, super wilds, super explosive wilds, and/or any other symbol and/or any other symbol combinations. In one example, a wrap-around explosive wild may be able to reach around to the other size of the display/plurality of reels. In this example, wrap-around explosive wild may explode onto/enter into a wrap-around cell. Wrap-around explosive wild may generate rewards (e.g., wild symbols, symbols, super-wild symbols, credits, multipliers, free spins, any other reward, and/or any combination thereof) in wrap-around cell because wrap-around cell may be considered to be directly adjacent to Col. V. In various examples, the wrap-around effect may be from bottom-to-top, top-to-bottom, left-to-right, right-to-left, and/or any combination thereof.

In various examples, explosive wilds and wrap-around explosive wilds may have a power level of one in all directions. Explosive wilds may have entered any cell in any directions that was located adjacent (e.g., one spatial unit in any direction) to explosive wilds. Wrap-around explosive wilds may have entered any cell in any directions that was located adjacent (e.g., one spatial unit in any direction) and/or virtual adjacent (e.g., one spatial unit in any direction including moving a row and/or column) to wrap-around explosive wild. In exemplary embodiments, any form of explosive wild may have different power levels (e.g., power level one—one spatial unit, power level two—two spatial units, power level three—three spatial units, power level one in first direction 532 with a power level of five in third direction 526, etc.). Further, any form of explosive wild may be limited to one or more directions. For example, any form of explosive wild may be limited to one or more of first direction 522, second direction 524, third direction 526, fourth direction 528, fifth direction 530, sixth direction 532, seventh direction 534, and eight direction 536, which were described in relation to FIG. 5B. In addition, the direction may be two spaces to the left and then one space up. Further, a direction may be two spaces down, three spaces to the right, and then one space up. Lastly, a direction or power level may be any path that may be created on the plurality of reels.

In one example, a first explosive persistent wild, a second explosive persistent wild, a third explosive persistent wild, and an Nth explosive persistent wild may be utilized, according to one embodiment. First explosive persistent wild may have a power level of one which may only reach to the cell one spatial unit away. First explosive persistent wild would be able to expand one spatial unit in one direction, which would be located one unit to the right and up one unit. This expansion (e.g., explosion) may reveal wild symbols, symbols, super-wild symbols, credits, multipliers, free spins, any other reward, and/or any combination thereof.

Second explosive persistent wild may have a power level of two which may only reach in two directions (e.g., up and right). Second explosive persistent wild would be able to expand two spatial units in two directions. First, second explosive persistent wild may expand two spatial units up to cell (Row A/Col. X). This expansion may or may not also include cell (Row B/Col. X). Second, second explosive persistent wild may expand two spatial units to cell (Row C/Col. Z). This expansion may or may not also include cell (Row C/Col. Z). These expansions (e.g., explosions) may reveal wild symbols, symbols, super-wild symbols, credits, multipliers, free spins, any other reward, and/or any combination thereof.

Third explosive persistent wild may have a varying power level of one and/or three which may only reach in two directions (e.g., left and right diagonally up). Third explosive persistent wild would be able to expand three spatial units in one direction (e.g., left) and one spatial unit in one direction (e.g., diagonally up and to the right). First, third explosive persistent wild may expand three spatial units up to cell (Row E/Col. V). This expansion may or may not also include cells (Row E/Col. W and/or Row E/Col. X). Second, third explosive persistent wild may expand one spatial unit to cell (Row D/Col. Z). This expansion may or may not also include cell (Row C/Col. Z). These expansions (e.g., explosions) may reveal credits, multipliers, free spins, any other reward, and/or any combination thereof.

In other embodiments, an explosive symbol may have varying power levels which create a path. For example, from an initial starting point the power level may be two in the down direction (e.g., two spatial units down). From that point two spatial units down, the power level may be three spatial units to the right. From that point three spatial units to the right, the power level may be two spatial units up. From that point two spatial units up, the power level may be three spatial units to the left, which would be a return to the initial starting point. Any path may be created by combining various power levels and directions.

In another example, one or more modifying symbols may change one or more characteristics of another symbol based on a relative position of one or more modifying symbols to the other symbol. Further, one or more modifying symbols may change one or more characteristics of the other symbols when the other symbols and the one or more modifying symbols are on the same payline.

For example, one or more characteristics of explosive wild in cell (Row B/Col. V) may be changed by one or more modifying symbols when this explosive wild is located adjacent (and/or within a predetermined area of) to the one or more modifying symbols. In one example, this explosive wild had a power level of one, which is changed into a power level of five by one or more modifying symbols. In another example, this explosive wild is changed into one of a scatter, a super wild, a super exploding wild, and/or any other symbol by one or more modifying symbols. In another example, this explosive wild had a power level of three, which is changed into a power level of one by the one or more modifying symbols.

One or more modifying symbols may change the directional characteristics of explosive wild. For example, explosive wild may have expanded one spatial unit in any direction. However, one or more modifying symbols may eliminated one or more of the directions that explosive wild may expand. In another example, if modifying symbol is located in an interactive position with two or more explosive wild symbols, then modifying symbol may have no effect on one or more of the explosive wild. Alternatively, modifying symbol may have an increased effect on one or more of the explosive wilds.

In one example, two or more explosive wilds in an interactive position (e.g., adjacent to, on the same payline, within a predetermined area, on the same row, in the same column, etc.) may generate a super explosive wild. For example, the two explosive wilds may each have had a power level of one. Super explosive wild may have a power level of two and expands into a first area. In another example, super explosive wild may have a power level of two and be a wrap-around explosive wild. Further, super explosive wild may have increased the reward generated in the cells that super explosive wild expanded into relative to what would have been generated by either of the two explosive wilds. Super explosive wilds may have any power level and any directional characteristics.

In another example, the first explosive wild may have a power level of one and the second explosive wild may have a power level of three. When the first explosive wild is combined with the second explosive wild, super wild may have a power level of five. In addition, super wild may be able to reach every cell on the plurality of reels.

Figure 6J:
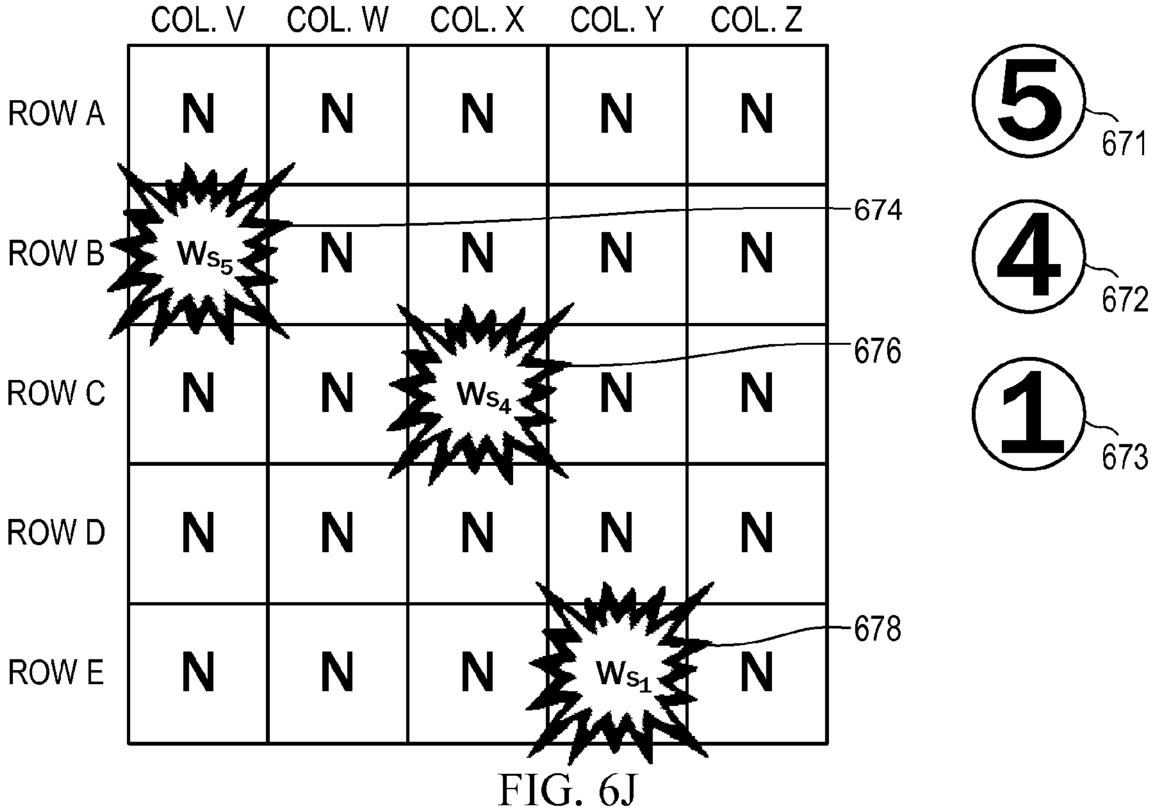
FIG. 6J is another illustration of a persistent wild gaming functionality on an exemplary gaming system, according to one embodiment.

In FIG. 6J, another illustration of a persistent wild gaming functionality on an exemplary gaming system is shown, according to one embodiment. In this example, a first persistent wild 674 has five more spins to be held at a first location (e.g., Row B/Col. V) before exploding, which is indicated on a first persistent wild counter 671 by the number five. In this example, a second persistent wild 676 has four more spins to be held at a second location (e.g., Row C/Col. X) before exploding, which is indicated on a second persistent wild counter 672 by the number four. In this example, a third persistent wild 678 has one more spin to be held at a third location (e.g., Row E/Col. Y) before exploding, which is indicated by the number one.

In one example, there can be multiple stuck wilds (e.g., one or more persistent wilds) on the screen at once and each one may have an independent counter attached to it. When each individual counter expires, the symbol with the zeroed out counter explodes to create the multiple wilds and then returns to normal behavior for the spin after that.

Figure 7:
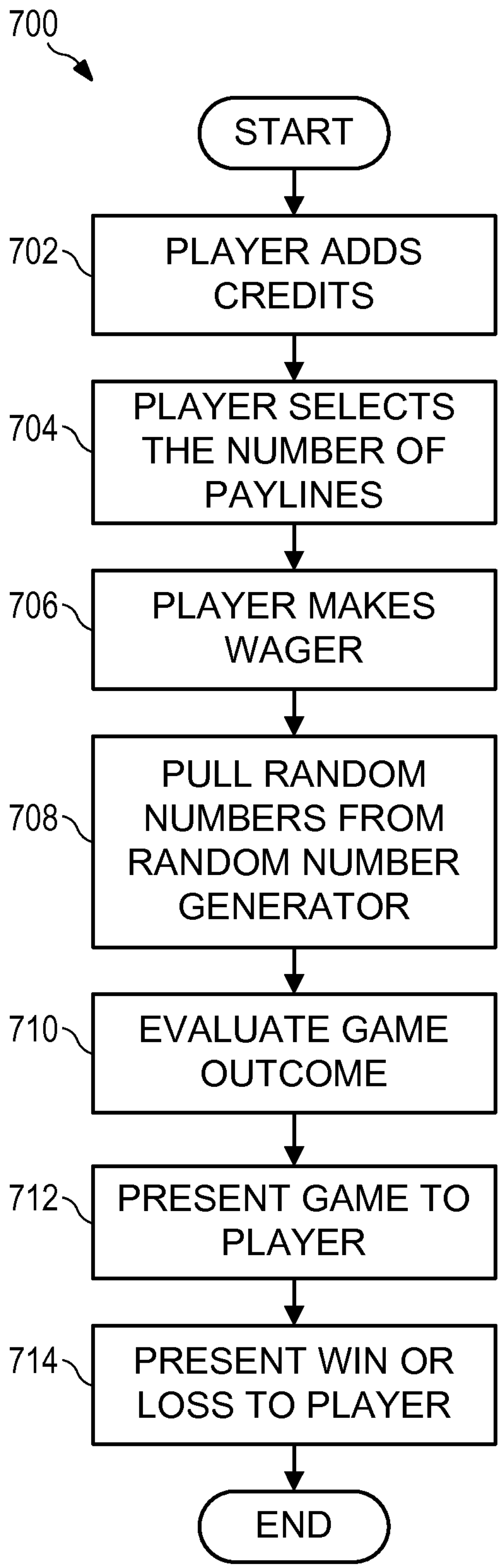
FIG. 7 is a flow diagram for game play, according to one embodiment.

FIG. 7 is a process flowchart of one example of a primary game play 700 on an electronic gaming system, according to one embodiment. The method may include the step of a player adding credit to the electronic gaming system (step 702). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 704, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 706, the player makes a wager on the game. In one embodiment, the wager may be a multiple of the number of paylines selected at step 704. In another embodiment, the wager may not be a multiple of the number of paylines selected at step 704. In a further embodiment, the wager may include a side-wager (e.g., ante bet), which may, in one example of such an embodiment, be used to make the player eligible to be awarded the extra functionality discussed above. It should be appreciated that in some embodiments, the order of steps 704 and 706 may be not critical, and so for example, a player can select the wager they wish to place, and then select the number of paylines they want it applied to, and that these embodiments are expressly contemplated as being within the scope of the present disclosure.

Continuing to step 708, the gaming system pulls random numbers from a random number generator ("RNG"). In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At steps 710 and 712, the gaming system utilizes the random numbers pulled at step 708 to determine the primary game symbols to display in the play of the primary game, which in turn both determines the presentation of the game to the player and evaluates the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 714, the win or loss outcome may be identified for the player. In one embodiment, this step can include additional messaging, which provides information related to the win or loss, such as why the player won or lost. In another embodiment, this step can include identification of the amount of any award earned by the player.

Figure 8:
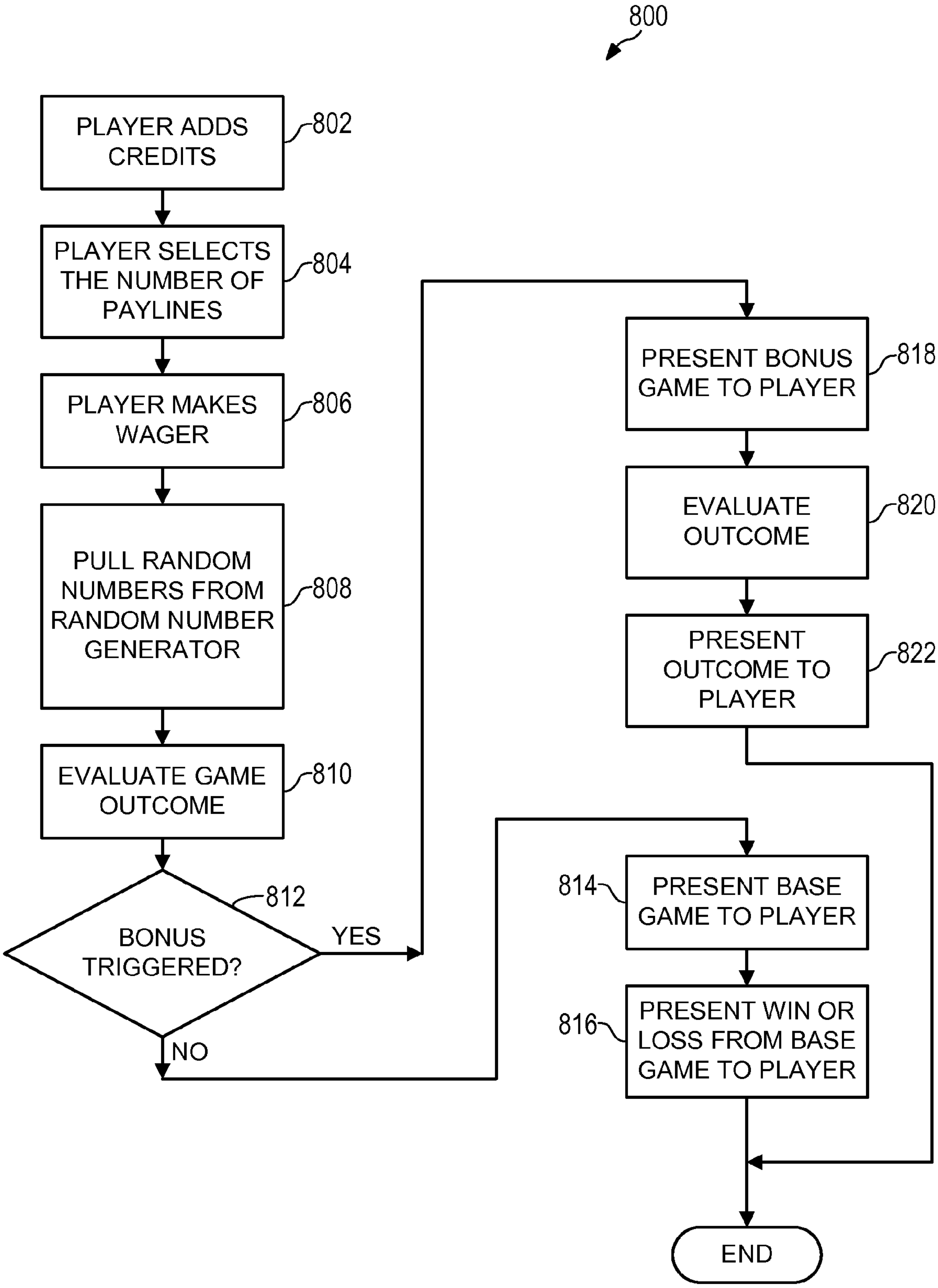
FIG. 8 is another flow diagram for game play, according to one embodiment.

FIG. 8 is a process flowchart of one example of a combined primary and secondary game play 800 on an electronic gaming system, according to one embodiment. The method may include the step of a player adding credit to the electronic gaming system (step 802). It is contemplated that a player can do this by inserting cash, coins, a ticket representative of a cash value, a credit card, a player card, requesting an electronic funds transfer ("EFT"), otherwise requesting access to an account having monetary funds, and/or any combination thereof.

At step 804, the player selects the number of paylines to play. In one embodiment, the player can select from a plurality of different paylines to play. In a further embodiment, the player can only play a predetermined number of paylines. An example of this embodiment may be the instance where the gaming system only allows a player to play forty paylines, and cannot select to play more or less paylines. In another embodiment, the gaming system does not offer paylines, but rather offers a different way to evaluate the game play. One example of a different way may be sometime referred to as a 243-ways evaluation, where symbols may be evaluated based on the existence of like-symbol clusters on adjacent reels, starting with the left-most reel and continuing right, instead of how many paylines run through the like-symbol clusters.

At step 806, the player makes a wager on the game. In one embodiment, the wager may be a multiple of the number of paylines selected at step 804. In another embodiment, the wager may not be a multiple of the number of paylines selected at step 804. In a further embodiment, the wager may include a side-wager, which may, in one example of such an embodiment, be used to make the player eligible to be awarded the extra functionality discussed above. It should be appreciated that in some embodiments, the order of steps 804 and 806 may be not critical, and so for example, a player can select the wager they wish to place, and then select the number of paylines they want it applied to, and that these embodiments may be expressly contemplated as being within the scope of the present disclosure.

Continuing to step 808, the gaming system pulls random numbers from a random number generator "RNG". In one embodiment, the system pulls one random number for each reel. In another embodiment, the system pulls one random number which may be utilized to determine the stop positions for each reel. In another embodiment, the random numbers determined by the RNG may be based on the time that the numbers may be pulled. In another embodiment, the random numbers determined by the RNG may be based on the prior numbers pulled.

At step 810, the gaming system utilizes the random numbers pulled at step 808 to evaluate the game outcome. In one embodiment, the random numbers pulled determine the stopping positions for the reels, which may be then caused to stop at those associated positions, and then the gaming system evaluates the displayed primary game symbols to determine the game outcome. In another embodiment, the gaming system determines the game outcome based on the pulled random numbers, and then causes the game to present an associated outcome to the player.

At step 812, the gaming system determines if a secondary or bonus game may be triggered. In one embodiment, the bonus game is triggered by the display of a plurality of matching symbols at a plurality of predetermined symbol positions within a play of the primary game. In one example, the bonus game may be triggered if a plurality of matching symbols is displayed on the $2^{nd}$, $3^{rd}$ and $4^{th}$ reel. In another example, the bonus game may be triggered if matching symbols are displayed on the $1^{st}$, $2^{nd}$ and $3^{rd}$ reels. In a further example, the bonus game may be triggered if matching symbols occur at predetermined symbol positions that include consecutive and non-consecutive reels. In another example, a bonus game (e.g., secondary game) may be triggered in any way (e.g., one special symbols in any locations, one special symbol in one or more predetermined locations, two special symbols in any locations, two special symbols in one or more predetermined locations, three special symbols in any locations, three special symbols in one or more predetermined locations, etc.).

If it is determined that a bonus or secondary game was not triggered, the process continues to step 814, where the base game may be fully presented to the player. As discussed above, the orders of step 810, 812, and 814 can be changed without affecting the novel concepts disclosed herein.

At step 816, the win or loss outcome of the primary game may be identified for the player. In one embodiment, this step can include additional messaging, which provides information related to the win or loss, such as why the player won or lost. In another embodiment, this step can include identification of the amount of any award earned by the player If it is determined at step 812 that a bonus or secondary game was triggered, then process 800 continues to step 818, where the secondary game may be presented to the player. As discussed above, there are numerous ways to present the secondary or bonus game to the player.

At steps 820 and 822, the outcome of the secondary game may be evaluated and presented to the player. In one embodiment, the outcome of the bonus game will always be a winning outcome. In another embodiment, the outcome of the secondary game will cause a significant award to be provided to the player. In one example of such an embodiment, the award may not be provided by the gaming system, as a casino operator may need to verify tax information before allowing such an award to be provided to the player. In one embodiment, instead of the process 800 ending after step 822, the process continues to step 814 so as to finalize the primary game outcome presentation to the player.

Figure 9:
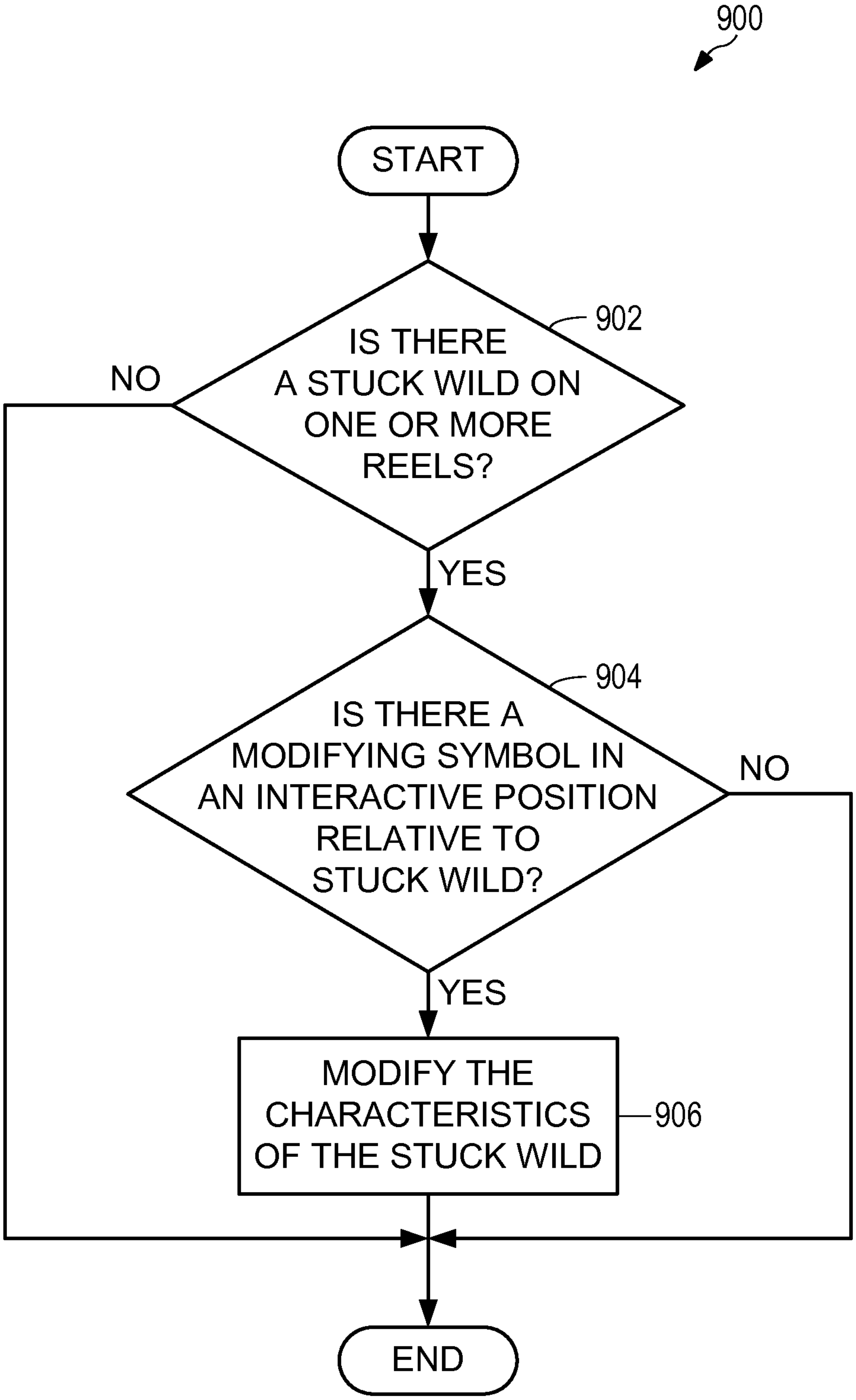
FIG. 9 is another flow diagram for game play, according to one embodiment.

In FIG. 9, another flow diagram for game play is shown, according to one embodiment. In one embodiment, the method may include electronic gaming device 100 and/or electronic gaming system 200 determining whether there is one or more stuck wild symbols on one or more reels (step 902). If there are no stuck wild symbols on one or more reels, the method may end. If there are one or more stuck wild symbols on one or more reels, then the method may include electronic gaming device 100 and/or electronic gaming system 200 determining whether there is one or more modifying symbols in an interactive position relative to stuck wild (step 904). If there are no modifying symbols in an interactive position relative to stuck wild, then the method may end. If there are one or more modifying symbols in one or more interactive positions relative to one or more stuck wild symbols, then the method may modify the characteristics of the one or more stuck wilds (step 906).

For example, one or more characteristics of one or more explosive persistent wilds located in one or more symbol cells may be changed by one or more modifying symbols when the one or more explosive persistent wilds are located in one or more predetermined positions (e.g., adjacent, within a specific spatial range, etc.) relate to the one or more modifying symbols. In one example, a first explosive persistent wild may have had a power level of one, which is changed into a power level of five by being within one or more interactive positions to one or more modifying symbols. In another example, a second explosive persistent wild may be changed into one of a scatter, a super wild, a super exploding wild, and/or any other symbol by one or more modifying symbols based on one or more interactive relationships. In another example, a third explosive persistent wild may have had a power level of three, which is changed into a power level of one by the one or more modifying symbols based on one or more interactive relationships.

Figure 10:
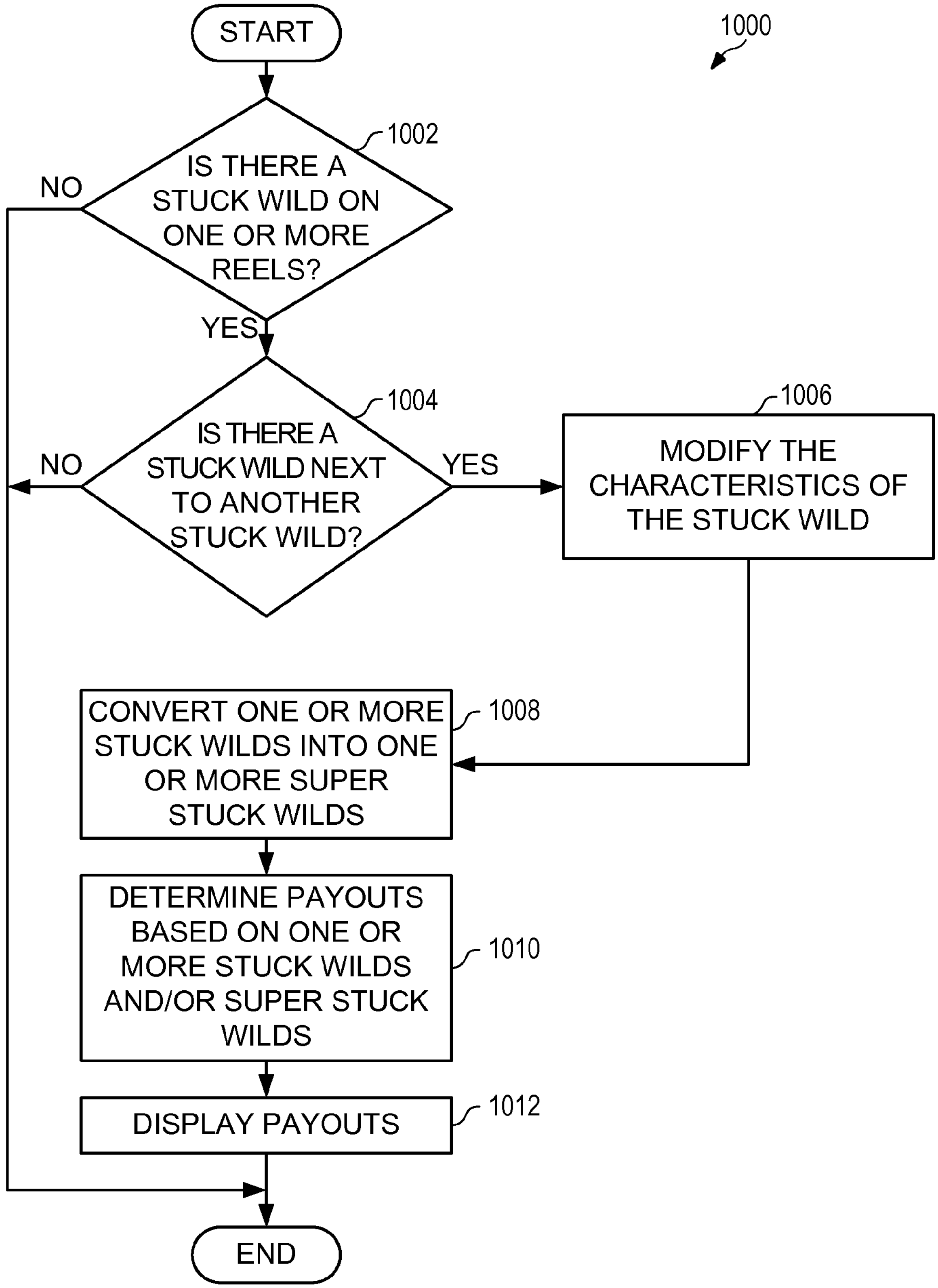
FIG. 10 is another flow diagram for game play, according to one embodiment.

In FIG. 10 another flow diagram for game play is shown, according to one embodiment. In one embodiment, the method may include electronic gaming device 100 and/or electronic gaming system 200 determining whether there is one or more stuck wilds on one or more reels (step 1002). If there are no stuck wild symbols on one or more reels, the method may end. If there are one or more stuck wild symbols on one or more reels, then the method may include electronic gaming device 100 and/or electronic gaming system 200 determining whether there is one or more stuck wilds next to another stuck wild (step 1004). If there is one or more stuck wilds next to another stuck wild, the method may modify the characteristics of one or more of the stuck wilds (step 1006) and moves to step 1008. If there are no stuck wilds next to any other stuck wild, then the method may end. The method may include converting one or more stuck wilds into one or more super stuck wilds (step 1008). The method may determine one or more payouts based on one or more stuck wilds and/or one or more super stuck wilds (step 1010). The method may display one or more payouts (step 1012).

For example, two or more explosive persistent wilds may be in one or more interactive positions (e.g., adjacent to, on the same payline, within a predetermined area, on the same row, in the same column, etc.) may generate a super explosive persistent wild. In this example, the two or more explosive persistent wilds may be scheduled to explode during the same spin to create one or more super wilds. In this example, the two explosive persistent wilds may each have had a power level of one. Super explosive wild may have a power level of two and expands into a first area. In another example, super explosive wild may have a power level of two and be a wrap-around explosive wild. Further, super explosive wild may have increased the reward generated in the cells that super explosive wild expanded into relative to what would have been generated by either of the two explosive wilds. Super explosive wilds may have any power level and any directional characteristics.

Figure 11:
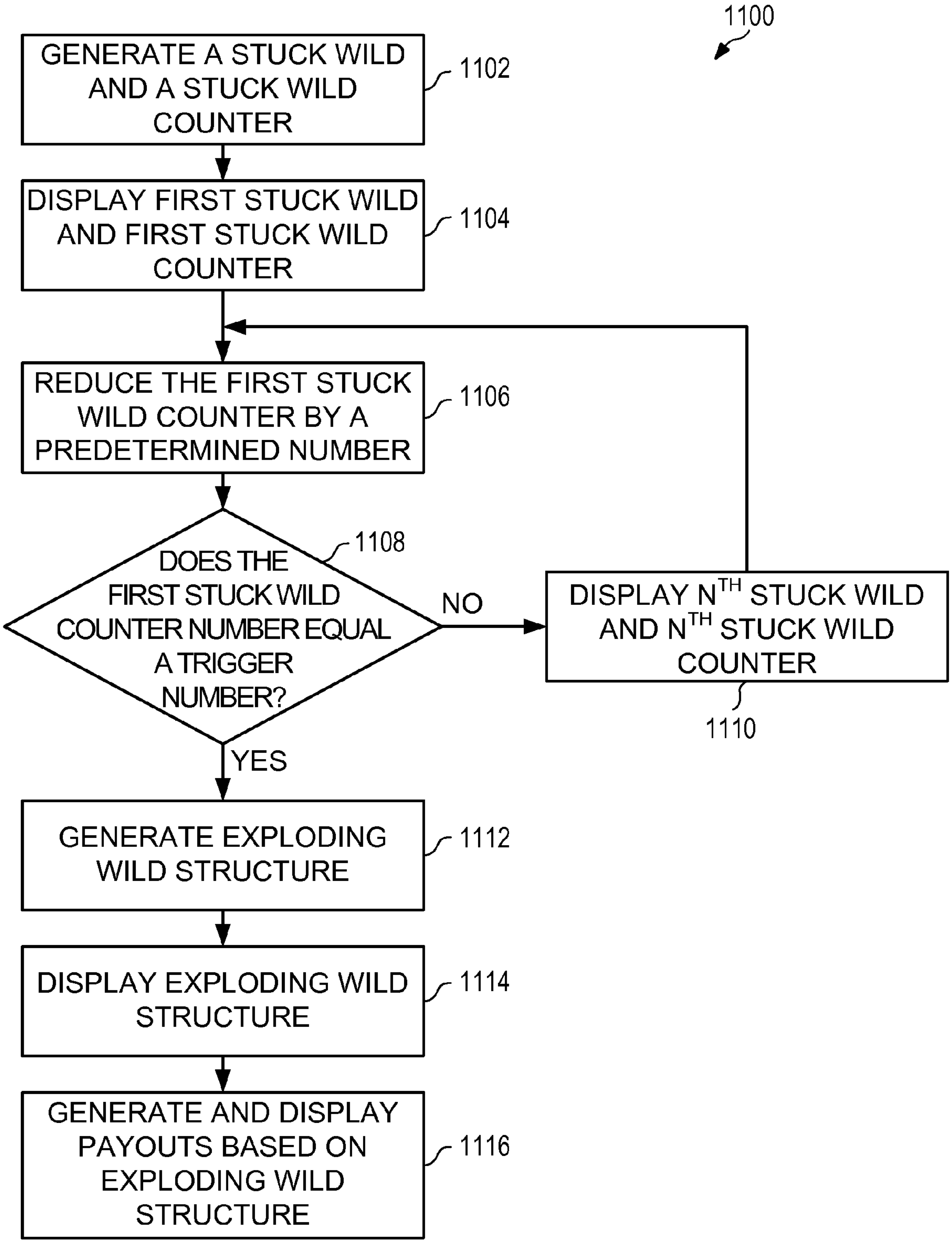
FIG. 11 is another flow diagram for game play, according to one embodiment.

In FIG. 11, another flow diagram for game play is shown, according to one embodiment. In one embodiment, the method may include generating a stuck wild and a stuck wild counter (step 1102). The method may include displaying the first stuck wild and the first stuck wild counter (step 1104). The method may include reducing the stuck wild counter by a predetermined number based on a game event (e.g., spin) (step 1106). The method may include electronic gaming device 100 and/or electronic gaming system 200 determining whether the stuck wild counter number equals a trigger number (step 1108). If the stuck wild counter number does not equal a triggering number, then the method may display an Nth stuck wild and Nth stuck wild counter (step 1110) and return to step 1106. If the stuck wild counter number does equal a triggering number, then the method may include generating (obtaining and/or deploying) an exploding wild structure (step 1112). The method may include displaying the exploding wild structure (step 1114). The method may include generating and displaying one or more payouts based on the exploding wild structure (step 1116).

Figure 12A:
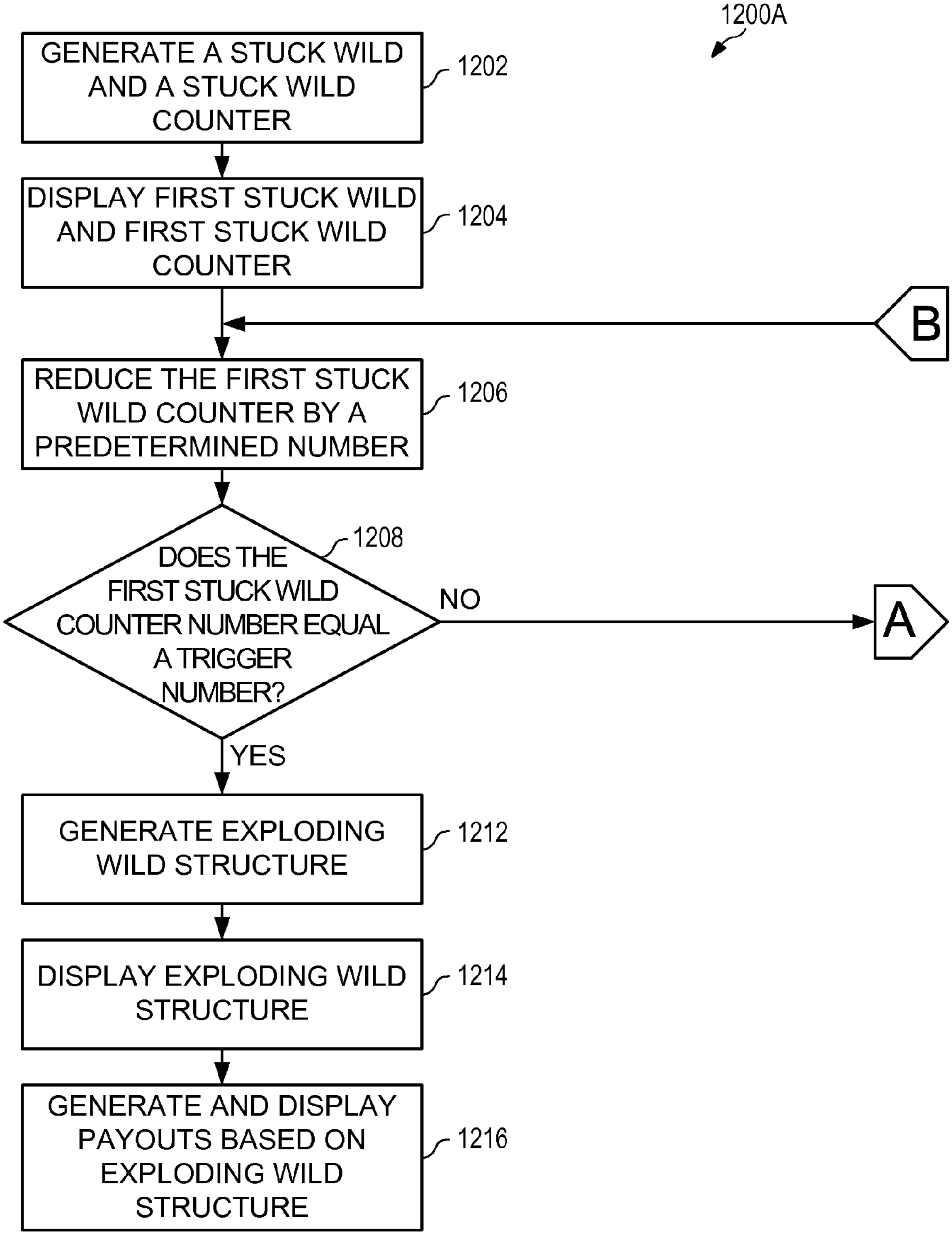
FIG. 12A is another flow diagram for game play, according to one embodiment.

In FIG. 12A, another flow diagram for game play is shown, according to one embodiment. In one embodiment, the method may include generating a stuck wild and a stuck wild counter (step 1202). The method may include displaying a first stuck wild and a first stuck wild counter (step 1204). The method may include reducing the first stuck wild counter by a predetermined number (e.g., one spin, 5 seconds, etc.) (step 1206). The method may include electronic gaming device 100 and/or electronic gaming system 200 determining whether the first stuck wild counter number equals a triggering number (step 1208). If the first stuck wild counter number equals a triggering number, then the method may include: generate one or more exploding wild structures (step 1212); displaying one or more exploding wild structures (step 1214); and/or generating and displaying one or more payouts based on the one or more exploding wild structures (step 1216).

Figure 12B:
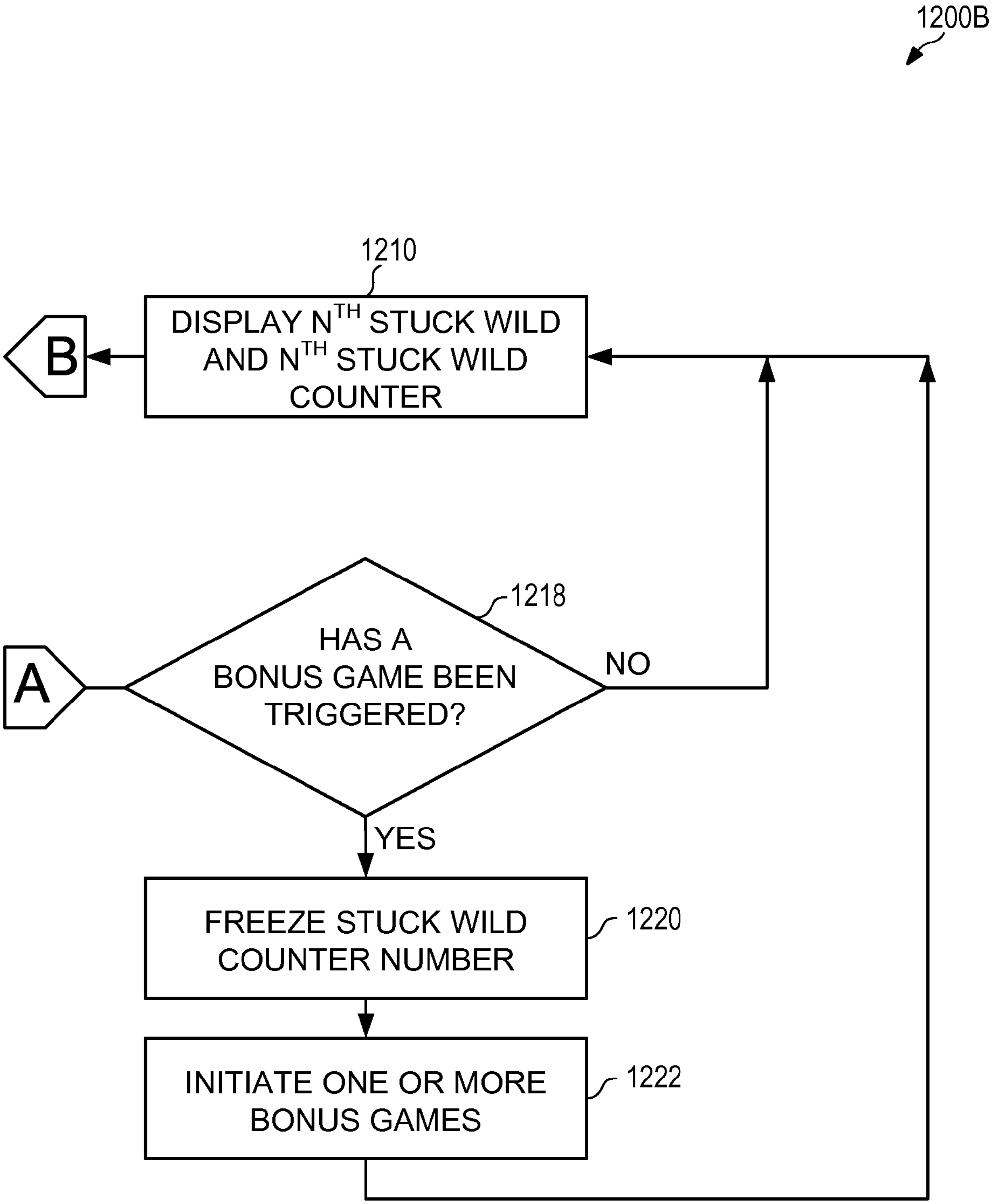
FIG. 12B is another flow diagram for game play, according to one embodiment.

If the first stuck wild counter number does not equal a triggering number, then the method (see FIG. 12B) may include electronic gaming device 100 and/or electronic gaming system 200 determining whether a bonus game has been triggered (step 1218). If no bonus game has been triggered, then the method may include displaying an Nth stuck wild and an Nth stuck wild counter (step 1210) and returning to step 1206 (see FIG. 12A). If a bonus game has been triggered, then the method may include freezing the first stuck wild counter number (step 1220). The method may include initiating one or more bonus games (step 1222). Once the bonus game is completed, then the method moves back to step 1210.

For example, FIG. 6J shows that there are five spins remaining where one or more persistent wilds may explode. In this example, third persistent wild 678 has one more spin to be held at a third location (e.g., Row E/Col. Y) before exploding, which is indicated by the number one. During the next spin for game play, third persistent wild 678 may explode, while the counter for the first persistent wild 674 will be reduced to four and the counter for the second persistent wild 676 will be reduced to three. On the third spin, second persistent wild 676 may explode. On the fourth spin, first persistent wild 674 may explode. There may be any number of persistent wilds (e.g., 1 to N). If one or more of the persistent wilds exploded during the same spin, then one or more super wilds may be created.

In one example, the system and/or method may determine that a key value (e.g., winning amount) is 10,000 credits. The key value may be the amount of credits (and/or multipliers and/or free spins and/or any other item of value) won. In this example, the 10,000 credit key value number may be utilized to determine one or more presentations associated with this 10,000 credits key value number. There may be presentation indexes numbered 0 to N associated with the 10,000 credits key value number.

The system and/or method may select (e.g., randomly, by a predetermined pattern, shuffle, combination thereof, and/or any other selection method) one or more of the presentations based on the key value.

In one example, the method may include determining a winning credit amount. The method may include looking up one or more presentations related to the winning credit amount. The method may include modifying the set of presentations relating to the winning credit amount based on one or more criteria. The method may include selecting a presentation from the modified set of presentations based on one or more criteria. The method may include displaying the selected presentation. The method may end.

For example, the presentation may be modified to include an advertisement, a movie trailer, a movie promotion, a casino event, a casino promotion, an actor's image, the player's image, etc.

In one embodiment, the electronic gaming device may include a plurality of reels; one or more paylines formed on at least a portion of the plurality of reels, a memory, and a processor. The memory may include a presentation module. The presentation module may include a plurality of presentations. The processor may determine a value. The processor may select one or more presentations based on the value.

In another example, the processor may randomly select the one or more presentations related to the value. In an example, the processor may select the one or more presentations related to the value in a predetermined pattern.

In another example, the value may be based on an input from a player. In an example, the processor may display a presentation based on one or more presentations. In another example, the processor may display a themed presentation based on one or more criteria. In an example, the themed presentation may be based on an advertisement and/or any other theme.

In another embodiment, the method of providing gaming options via an electronic gaming device may include receiving one or more primary wagers on one or more paylines, starting a bonus game, determining one or more values, and/or selecting one or more presentations based on the one or more values.

In an exemplary embodiment, an electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more selected paylines (e.g., one or more persistent wild reel game functionalities, repeat paylines, patterns, scenarios, etc.). The selected paylines may be based on data received from a player. The processor may determine a selected payline's payout based on the one or more selected paylines (e.g., one or more persistent wild reel game functionalities, repeat paylines, patterns, scenarios, etc.).

In another example, the display may shade one or more non-selected paylines. The electronic gaming device may include a player preference input device. The player preference input device may modify a game configuration based on data from an identification device. The processor may multiply a prize value based on a selected payline occurrence.

In another example, the method may include obtaining a player preference data and modifying a game configuration based on the player preference data. The method may include receiving data from at least one of a server and one or more gaming devices.

In another example, the processor may determine a payout based on the primary wagers. The processor may receive one or more secondary wagers on one or more patterns. The electronic gaming device may include a display, which may display a game status image.

In another embodiment, the electronic gaming system may include a server. The server may include a server memory, a server processor, and a signage server. The server memory may include historical gaming data. The server processor may generate a gaming message based on the historical gaming data. The signage server may transmit the gaming message.

In another example, the gaming message may be transmitted to an internal display of a gaming entity. The internal display may be a non-gaming device display. The gaming message may be transmitted to an external display of a gaming entity. The external display may be located outside of a gaming entity. The gaming message may be transmitted to at least one of a top display, a main display, and a side display.

The plurality of reels may form a 5-by-5 matrix, a 3-by-5 matrix, a 4-by-5 matrix, a 4-by-3 matrix, a 5-by-3 matrix, or any number-by-any number matrix. The symbols may be an image of a card, an image, and/or other objects. For example, it could be a pot of gold, an ace of spades, a diamond, or any other symbol. The symbols may be animation. The symbols may be a picture. For example, it may be a picture of the player as taken by camera 312. The symbols may be a number. The symbols may be any image. The symbols may be blank.

The disclosed features may be part of the base game and/or a bonus game. In addition, the disclosed features may be part of a base bet and/or may require an additional side bet (e.g., ante bet).

In one embodiment, the electronic gaming device may include a plurality of reels, a memory, and one or more processors. The plurality of reels may include one or more areas. The one or more processors may generate one or more symbols to be located in the one or more areas. The one or more symbols may include one or more persistent wilds. The one or more processors may hold for one or more subsequent spins the one or more persistent wilds in one or more locations based on one or more persistent wild counter numbers.

In another example, the one or more processors may reduce the one or more persistent wild counter numbers based on a game spin occurrence. In another example, the one or more processors may expand one or more persistent wilds based on one or more counter triggering events. In another example, the one or more processors may modify one or more persistent wilds based on one or more interaction determinations.

In another example, a first interaction determination may be based on a first expanding wild symbol location and a second expanding symbol location. In another example, the first interaction determination may be that the first expanding wild symbol location is within a predetermined area in relation to the second expanding wild symbol location. In another example, the one or more processors may hold one or more persistent wild counter numbers based on an initiated bonus game.

In another embodiment, a method of providing gaming options via an electronic gaming device may include: displaying a first persistent wild symbol; determining a first persistent wild counter number; and/or holding for a subsequent spin the first persistent wild symbol in a first location based on the first persistent wild counter number.

In another example, the method may include reducing the first persistent wild counter number based on a game spin occurrence. In one example, the method may include expanding the first persistent wild based on a first persistent wild counter triggering event. In another example, the method may include expanding the first persistent wild based on a first persistent wild counter triggering event. The method may include modifying a first persistent wild characteristic based on one or more interaction determinations. In one example, a first interaction determination is based on a first expanding wild symbol location and a second expanding symbol location. In one example, the method may include holding the first persistent wild counter number based on an initiated bonus game.

In another embodiment, the electronic gaming system may include a server. The server may include a server memory and a server processor. The server processor may display a plurality of reels which include one or more symbols. The server processor may generate one or more symbols to be located in the one or more areas. The one or more symbols may include one or more persistent wilds. The server processor may hold for one or more subsequent spins the one or more persistent wilds in one or more locations based on one or more persistent wild counter numbers.

In another example, the server processor may reduce the one or more persistent wild counter numbers based on a game spin occurrence. In another example, the server processor may expand one or more persistent wilds based on one or more counter triggering events. In another example, the server processor may modify one or more persistent wilds based on one or more interaction determinations. In one example, a first interaction determination is based on a first expanding wild symbol location and a second expanding symbol location. The first interaction determination may be that the first expanding wild symbol location is within a predetermined area in relation to the second expanding wild symbol location.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system may be powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system may be different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," "may," "another example," and/or similar language, should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:
- a plurality of display areas, the plurality of display areas configured to display one or more symbols;
- a credit device configured to accept an item associated with a monetary value;
- a memory;
- a processor configured to determine a credit balance based at least in part on the received item, the processor configured to determine a wager amount relating to game play where the wager amount is subtracted from the credit balance, the processor configured to generate one or more symbols to be located in the one or more display areas, the one or more symbols include one or more persistent wilds, the processor configured to hold for one or more subsequent spins a first persistent wild in a first location on a first reel and a second persistent wild in a second location on a second reel where the first persistent wild is held in the first location on the first reel until a first persistent wild counter number reaches a trigger number and the first persistent wild being configured to explode based on the first persistent wild counter number reaching the trigger number, and the processor configured to determine one or more payouts based on game play where the credit balance is increased by an determined awards associated with the one or more payouts.

2. The electronic gaming device of claim 1, wherein the processor is further configured to reduce one or more persistent wild counter numbers based on a game spin occurrence.

3. The electronic gaming device of claim 1, wherein the processor is further configured to expand one or more persistent wilds based on one or more counter triggering events.

4. The electronic gaming device of claim 1, wherein the processor is further configured to modify one or more persistent wilds based on one or more interaction determinations.

5. The electronic gaming device of claim 4, wherein a first interaction determination is based on a first expanding wild symbol location and a second expanding symbol location.

6. The electronic gaming device of claim 5, wherein the first interaction determination is that the first expanding wild symbol location is within a predetermined area in relation to the second expanding wild symbol location.

7. The electronic gaming device of claim 1, wherein the processor is further configured to hold one or more persistent wild counter numbers based on an initiated bonus game.

8. A method of providing gaming options via an electronic gaming device comprising:
- receiving via a credit device an item associated with monetary value;
- determining via one or more processors a credit balance based at least in part on the received item;
- receiving via a wager button a wager amount on a game play where the wager amount is deducted from the credit balance;
- displaying a first persistent wild symbol in a first location on a first reel;
- displaying a second persistent wild symbol in a second location on a second reel;
- determining via one or more processors a first persistent wild counter number;
- holding for subsequent spins the first persistent wild symbol in the first location on the first reel until the first persistent wild counter number reaches a triggering number;
- exploding the first persistent wild symbol based on the first persistent wild counter number reaching the triggering number; and
- determining one or more payouts based on game play and increasing the credit balance by any awards associated with the one or more payouts.

9. The method of claim 8, further comprising reducing the first persistent wild counter number based on a game spin occurrence.

10. The method of claim 9, further comprising expanding the first persistent wild based on a first persistent wild counter triggering event.

11. The method of claim 8, further comprising expanding the first persistent wild based on a first persistent wild counter triggering event.

12. The method of claim 8, further comprising modifying a first persistent wild characteristic based on one or more interaction determinations.

13. The method of claim 12, wherein a first interaction determination is based on a first expanding wild symbol location and a second expanding symbol location.

14. The method of claim 8, further comprising holding the first persistent wild counter number based on an initiated bonus game.

15. An electronic gaming system comprising:

a credit device configured to accept an item associated with a monetary value;

a server including a server memory and a server processor, the server processor configured to determine a credit balance based at least in part on the received item, the server processor configured to determine a wager amount me play where the wager amount is subtracted from the credit balance, the server processor configured to display one or more symbols on a display device include one or more persistent wilds, the server processor configured to hold for one or more subsequent spins a first persistent wild in a first location on a first reel and a second persistent wild in a second location on a second reel where the first persistent wild is held in the first location on the first reel until a first persistent wild counter number reaches a trigger number and the first persistent wild being configured to explode based on the first persistent wild counter number reaching the trigger number, and the server processor configured to determine one or more payouts based on game play where the credit balance is increased by any determined awards associated with the one or more payouts.

16. The electronic gaming system of claim 15, wherein the server processor is further configured to reduce one or more persistent wild counter numbers based on a game spin occurrence.

17. The electronic gaming system of claim 15, wherein the server processor is further configured to expand one or more persistent wilds based on one or more counter triggering events.

18. The electronic gaming system of claim 15, wherein the server processor is further configured to modify one or more persistent wilds based on one or more interaction determinations.

19. The electronic gaming system of claim 18, wherein a first interaction determination is based on a first expanding wild symbol location and a second expanding symbol location.

20. The electronic gaming system of claim 19, wherein the first interaction determination is that the first expanding wild symbol location is within a predetermined area in relation to the second expanding wild symbol location.

* * * * *